United States Patent
Kim et al.

(10) Patent No.: US 10,439,767 B2
(45) Date of Patent: Oct. 8, 2019

(54) APPARATUS FOR TRANSMITTING AND RECEIVING DATA THROUGH UNLICENSED BAND

(71) Applicant: ELECTRONICS AND TELECOMMUNICATIONS RESEARCH INSTITUTE, Daejeon (KR)

(72) Inventors: Eunkyung Kim, Daejeon (KR); Young Jo Ko, Daejeon (KR); Sung-Hyun Moon, Daejeon (KR); Seung-Kwon Baek, Daejeon (KR); Wooram Shin, Daejeon (KR); Chanho Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/236,371

(22) Filed: Aug. 12, 2016

(65) Prior Publication Data

US 2017/0048718 A1    Feb. 16, 2017

(30) Foreign Application Priority Data

Aug. 13, 2015   (KR) .................. 10-2015-0114924
Sep. 17, 2015   (KR) .................. 10-2015-0131865
(Continued)

(51) Int. Cl.
H04L 1/18        (2006.01)
H04W 56/00       (2009.01)
H04W 48/16       (2009.01)

(52) U.S. Cl.
CPC ....... H04L 1/1861 (2013.01); H04W 56/0005 (2013.01); H04W 48/16 (2013.01)

(58) Field of Classification Search
CPC .................. H04W 24/10; H04W 72/0413
(Continued)

(56) References Cited

U.S. PATENT DOCUMENTS 7,869,380 B2    1/2011   Jeon et al.
8,363,537 B2    1/2013   Ko et al.
(Continued)

FOREIGN PATENT DOCUMENTS

KR   10-2008-0114655 A   12/2008
KR   10-2010-0069063 A    6/2010
(Continued)

OTHER PUBLICATIONS

3GPP TR 36.889 V1.0.1 (Jun. 2015).
(Continued)

Primary Examiner — Iqbal Zaidi
(74) Attorney, Agent, or Firm — Rabin & Berdo, P.C.

(57) ABSTRACT

An apparatus for receiving a signal through an unlicensed band includes: a processor, a memory, and a radio frequency unit, wherein the processor executes a program stored in the memory to perform: receiving a secondary synchronization signal (SSS) in at least one remaining subframe except a subframe 0 or a subframe 5 of a plurality of subframes included in a discovery signal measurement timing configuration (DMTC), and detecting the SSS by using a subframe number of the subframe 0 or the subframe 5.

6 Claims, 22 Drawing Sheets

(30) Foreign Application Priority Data

| | | |
|---|---|---|
| Sep. 21, 2015 | (KR) | 10-2015-0133366 |
| Sep. 24, 2015 | (KR) | 10-2015-0135927 |
| Oct. 7, 2015 | (KR) | 10-2015-0141247 |
| Nov. 6, 2015 | (KR) | 10-2015-0156157 |
| Aug. 12, 2016 | (KR) | 10-2016-0102769 |

(58) Field of Classification Search
USPC .......................................... 370/252–500
See application file for complete search history.

(56) References Cited

U.S. PATENT DOCUMENTS

| | | |
|---|---|---|
| 8,570,984 B2 | 10/2013 | Jeon et al. |
| 8,593,936 B2 | 11/2013 | Ko et al. |
| 8,798,014 B2 | 8/2014 | Pan et al. |
| 8,971,168 B2 | 3/2015 | Ko et al. |
| 9,001,773 B2 | 4/2015 | Jeon et al. |
| 9,148,790 B2 | 9/2015 | Kang et al. |
| 9,306,724 B2 | 4/2016 | Kang et al. |
| 9,356,758 B2 | 5/2016 | Jeon et al. |
| 2009/0161610 A1 | 6/2009 | Kang et al. |
| 2012/0329400 A1 | 12/2012 | Seo et al. |
| 2013/0165134 A1 | 6/2013 | Touag et al. |
| 2013/0188506 A1 | 7/2013 | Cheong et al. |
| 2014/0036853 A1 | 2/2014 | Kim et al. |
| 2014/0079016 A1 | 3/2014 | Dai et al. |
| 2014/0161002 A1 | 6/2014 | Gauvreau et al. |
| 2014/0177546 A1 | 6/2014 | Kang et al. |
| 2015/0124771 A1 | 5/2015 | Ko et al. |
| 2015/0201431 A1 | 7/2015 | Um et al. |
| 2015/0223149 A1* | 8/2015 | Liu .............. H04W 48/12 370/252 |
| 2016/0127098 A1 | 5/2016 | Ng et al. |
| 2016/0270100 A1* | 9/2016 | Ng .............. H04L 1/1887 |
| 2017/0019924 A1 | 1/2017 | Wang et al. |
| 2017/0070312 A1* | 3/2017 | Yi .............. H04J 11/0036 |
| 2017/0238311 A1 | 8/2017 | Hooli et al. |
| 2017/0245168 A1 | 8/2017 | Yi et al. |

FOREIGN PATENT DOCUMENTS

| | | |
|---|---|---|
| KR | 10-2013-0128255 A | 11/2013 |
| KR | 10-2014-0010450 A | 1/2014 |
| KR | 10-2014-0054044 A | 5/2014 |
| KR | 10-2014-0073468 A | 6/2014 |
| KR | 10-2014-0083502 A | 7/2014 |

OTHER PUBLICATIONS

R1-154388, "Channel access procedure for LAA", 3GPP TSG RAN WG1 Meeting #82, Beijing, China, Aug. 24-28, 2015.
R1-155830, "DRS transmission over unlicensed carrier", 3GPP TSG RAN WG1 Meeting #82-bis, Malmö, Sweden, Oct. 5-9, 2015.
R1-155831, "Data transmission with LBT priority classes", 3GPP TSG RAN WG1 Meeting #82-bis, Malmö, Sweden, Oct. 5-9, 2015.
R1-157240, "Discussion and details on data transmission", 3GPP TSG RAN WG1 Meeting #83, Anaheim, USA, Nov. 15-22, 2015.
3GPP TS 36.300 V13.3.0 (Mar. 2016).
3GPP TS 36.213 V13.2.0 (Jun. 2016).
3GPP TS 36.211 V13.2.0 (Jun. 2016).
3GPP TR 36.808 V10.1.0 (Jul. 2013).
3GPP TR 36.823 V11.0.1 (Sep. 2013).
3GPP TR 36.847 V12.0.0 (Dec. 2013).
RP-141664, "Study on Licensed-Assisted Access using LTE", 3GPP TSG RAN Meeting #65, Edinburgh, Scotland, Sep. 9-12, 2014.
R1-143965, "LAA using LTE deployment and operational scenarios", 3GPP TSG RAN WG1 Meeting #78bis, Ljubljana, Slovenia, Oct. 6-10, 2014.
ETSI EN 301 893 V1.7.2 (Jul. 2014).
Recommendation ITU-R M.1652-1 (May 2011).
RP-150879, "Presentation of Specification/Report to TSG: TR 36.889, Version 1.0.1", 3GPP TSG RAN Meeting #68, Malmö, Sweden, Jun. 15-18, 2015.
R1-143961, "LAA using LTE operation, compliant to regulatory requirements", 3GPP TSG RAN WG1 Meeting #78bis, Ljubljana, Slovenia, Oct. 6-10, 2014.
R1-144921, "Required functionalities and possible solution related to SCE operation in unlicensed carrier", 3GPP TSG RAN WG1 Meeting #79, San Francisco, USA, Nov. 17-21, 2014.

* cited by examiner

APPARATUS FOR TRANSMITTING AND RECEIVING DATA THROUGH UNLICENSED BAND

CROSS-REFERENCE TO RELATED APPLICATION

This application claims priority to and the benefit of Korean Patent Application No. 10-2015-0114924, 10-2015-0131865, 10-2015-0133366, 10-2015-0135927, 10-2015-0141247, 10-2015-0156157, and 10-2016-0102769 filed in the Korean Intellectual Property Office on Aug. 13, 2015, Sep. 17, 2015, Sep. 21, 2015, Sep. 24, 2015, Oct. 7, 2015, Nov. 6, 2015, and Aug. 12, 2016, the entire contents of which are incorporated herein by reference.

BACKGROUND OF THE INVENTION (a) Field of the Invention

The present description relates to an apparatus for transmitting and receiving data through an unlicensed band.

(b) Description of the Related Art

As the number of mobile Internet users through a mobile communication system is increased, mobile communication operators is seeking an efficient method for increasing capacity of the mobile communication system. The most efficient and intuitive method is to increase a bandwidth by additionally securing a licensed band frequency for the mobile communication system. However, the licensed band frequency has an advantage that an efficient mobile communication service may be provided through monopolistic use of a corresponding frequency, but has disadvantages that permission and use costs of a frequency are high and a licensed band frequency allocated for the mobile communication system is limited. Therefore, mobile communication operators and manufacturers are studying a method for providing a mobile communication service using an unlicensed band frequency in which available frequency bands are relatively many and a cost is cheap, a TV White Space, or a frequency (hereinafter, referred to as an 'unlicensed band frequency') of licensed/unlicensed bands, or the like, shared between mobile communication system operators.

A communication system installed at the unlicensed band frequency has the following limitations.

First, transmission power is limited in order to minimize an influence on another system sharing the unlicensed band frequency. Therefore, in the case in which a licensed band system and an unlicensed band system are installed at the same position, a coverage hole may be generated.

In addition, the unlicensed band frequency should be discontinuously or randomly used for the purpose of fair coexistence with an adjacent unlicensed band system. Therefore, transmission reliability of a control channel and a common channel of the mobile communication system may be decreased.

In addition, a communication system should follow a frequency regulation of the unlicensed band. A system using the unlicensed band frequency should be operated on the basis of a listen before talk (LBT) for the purpose of transmission of data. For example, an apparatus (or a system) using the unlicensed band frequency should perform a clear channel assessment (CCA) and decide whether or not a channel is used depending on a CCA result. In this case, a channel occupancy time may be limited depending on a frequency regulation even though the channel is occupied depending on the CCA result, the channel may not be occupied for a time exceeding a maximum channel occupancy time, and the CCA should be additionally performed in order to reoccupy the channel.

Due to the limitations of the unlicensed band system as described above, a scenario of installing/operating the licensed band system and the unlicensed band system in a form in which they are complementary to each other rather than a standalone system using only the unlicensed band in providing a mobile communication service has been reviewed. In this scenario, a control function requiring reliability, such as a terminal control, mobility management, and the like, is performed through the licensed band frequency, and a traffic function such as a wireless transmission speed increase, wireless traffic load balancing, and the like, is operated in a form in which the licensed band system is complemented using the unlicensed band system. For example, the control function and the traffic function are performed through a carrier of the licensed band, and the traffic function is performed through a carrier of the unlicensed band.

The operations of the licensed band carrier and the unlicensed band carrier as described above may be implemented through a carrier aggregation (CA) technology of $3^{rd}$ generation partnership project long term evolution (3GPP LTE). For example, there is a carrier aggregation scheme between an unlicensed band frequency division duplex (FDD) carrier and the licensed band carrier or a carrier aggregation scheme between an unlicensed band time division duplex (TDD) carrier in which both of an uplink and a downlink are operated and the licensed band carrier.

A cellular system using the unlicensed band may provide a mobile communication service of which a quality of service (QoS) is ensured using cheap and rich frequency resources and a high level interference control technology. However, in order to solve various regulations present in the unlicensed band and a problem of coexistence with another unlicensed band system and secure the advantages as described above, a new coexistence technology and interference control technology are required. Particularly, due to characteristics of the unlicensed band, an apparatus operated in the unlicensed band may occupy and use a channel. In this case, in the case in which the carrier aggregation is used in order to solve the coexistence with another device in the unlicensed band and a problem due to a restriction of an operation in the unlicensed band, characteristics of the licensed band and the unlicensed band should be simultaneously considered. In addition, a service having reliability similar to that of an existing cellular service should be provided by reflecting limitations (characteristics) for operating an apparatus in the unlicensed band.

The above information disclosed in this Background section is only for enhancement of understanding of the background of the invention and therefore it may contain information that does not form the prior art that is already known in this country to a person of ordinary skill in the art.

SUMMARY OF THE INVENTION

The present description has been made in an effort to provide an apparatus for transmitting and receiving data through an unlicensed band.

An exemplary embodiment provides an apparatus for receiving a signal through an unlicensed band, including: a processor, a memory, and a radio frequency unit, wherein the processor may execute a program stored in the memory to perform: receiving a secondary synchronization signal (SSS) in at least one remaining subframe except a subframe 0 or a subframe 5 of a plurality of subframes included in a discovery signal measurement timing configuration (DMTC), and detecting the SSS by using a subframe number of the subframe 0 or the subframe 5.

The SSS may be configured by using length-62 sequence generated by the following equation, $$d(2n) = \begin{cases} s_0^{(m_0)}(n)c_0(n) & \text{in subframes } 0, 1, 2, 3, 4 \\ s_1^{(m_1)}(n)c_0(n) & \text{in subframes } 5, 6, 7, 8, 9 \end{cases}$$ [Equation]

$$d(2n+1) = \begin{cases} s_1^{(m_1)}(n)c_1(n)z_1^{(m_0)}(n) & \text{in subframes } 0, 1, 2, 3, 4 \\ s_0^{(m_0)}(n)c_1(n)z_1^{(m_1)}(n) & \text{in subframes } 5, 6, 7, 8, 9 \end{cases}$$

and the DMTC may include the subframes 0, 1, 2, 3, 4, or the subframes 5, 6, 7, 8, 9.

The processor may execute the program to further perform: acquiring a cell identification (Cell ID) based on the detection result of the SSS.

When the processor may perform receiving the SSS, the processor may perform receiving the SSS in a first subframe of the at least one remaining subframe, and The processor may execute the program to further perform receiving data in a next subframe after the first subframe of the at least one remaining subframe.

When the processor may perform receiving the SSS, the processor may perform receiving a primary synchronization signal (PSS) and cell-specific reference signal (CRS) in a first subframe of the at least one remaining subframe.

When the processor may perform receiving the SSS, the PSS, and the CRS, the processor may perform receiving a channel state information-reference signal (CSI-RS) in the first subframe.

When the processor may perform receiving the SSS, the PSS, and the CRS, the processor may perform receiving the SSS, the PSS, and the CRS in 12 orthogonal frequency division multiplexing (OFDM) symbols included in the first subframe.

The processor may execute the program to further perform: detecting the CRS by using a slot number of a slot included in the first subframe.

Another exemplary embodiment provides an apparatus for transmitting data through an unlicensed band, including: a processor, a memory, and a radio frequency unit, wherein the processor may execute a program stored in the memory to perform: receiving a hybrid automatic retransmission request (HARQ) ACK/NACK corresponding to a physical downlink shared channel (PDSCH); increasing, when the number of the HARQ NACK is larger than the number of the HARQ ACK as a predetermined ratio, a contention window value of a contention window used for accessing a channel of the unlicensed band; and performing a channel access procedure based on the increased contention window value.

The processor may execute the program to further perform: decreasing, when the number of the HARQ ACK is larger than the number of the HARQ NACK as the predetermined ratio, the contention window value of the contention window used for accessing the channel of the unlicensed band; and performing a channel access procedure based on the decreased contention window value.

When the processor may perform performing a channel access procedure based on the increased contention window value, the processor may perform performing a clear channel assessment (CCA) or an extended CCA based on the increased contention window value.

When the processor may perform receiving the HARQ ACK/NACK, the processor may perform receiving the HARQ ACK/NACK corresponding to the PDSCH of a foremost subframe included in a channel occupancy time (COT) for the channel.

The processor may execute the program to further perform: indicating the increased contention window value or a value used for updating the contention window value to a receiving device.

Yet another exemplary embodiment provides an apparatus for transmitting traffic through an unlicensed band, including: a processor, a memory, and a radio frequency unit, wherein the processor may execute a program stored in the memory to perform: transmitting traffic corresponding to second priority class which is lower than a first priority class used for a channel access; and transmitting, after the all traffic corresponding to the second priority class are transmitted, traffic corresponding to third priority class which is higher than the first priority class.

Energy detection thresholds respectively corresponding to the first priority class, the second priority class, and the third priority class may be different from each other.

The traffic corresponding to the second priority class may be a discovery reference signal or discovery signal, and the traffic corresponding to the third priority class is may be a physical downlink shared channel (PDSCH).

The first priority class, the second priority class, and the third priority class may be determined according to a type of the traffic.

The processor may execute the program to further perform: performing the channel access based on a clear channel assessment (CCA) parameter determined according to the first priority class, the second priority class, and the third priority class.

A channel occupancy time (COT) may be configured for each priority class, and when the processor may perform transmitting the traffic corresponding to each priority class, the processor may transmit the traffic during the COT corresponding to each priority class.

DETAILED DESCRIPTION OF THE EMBODIMENTS

Figure 1A:
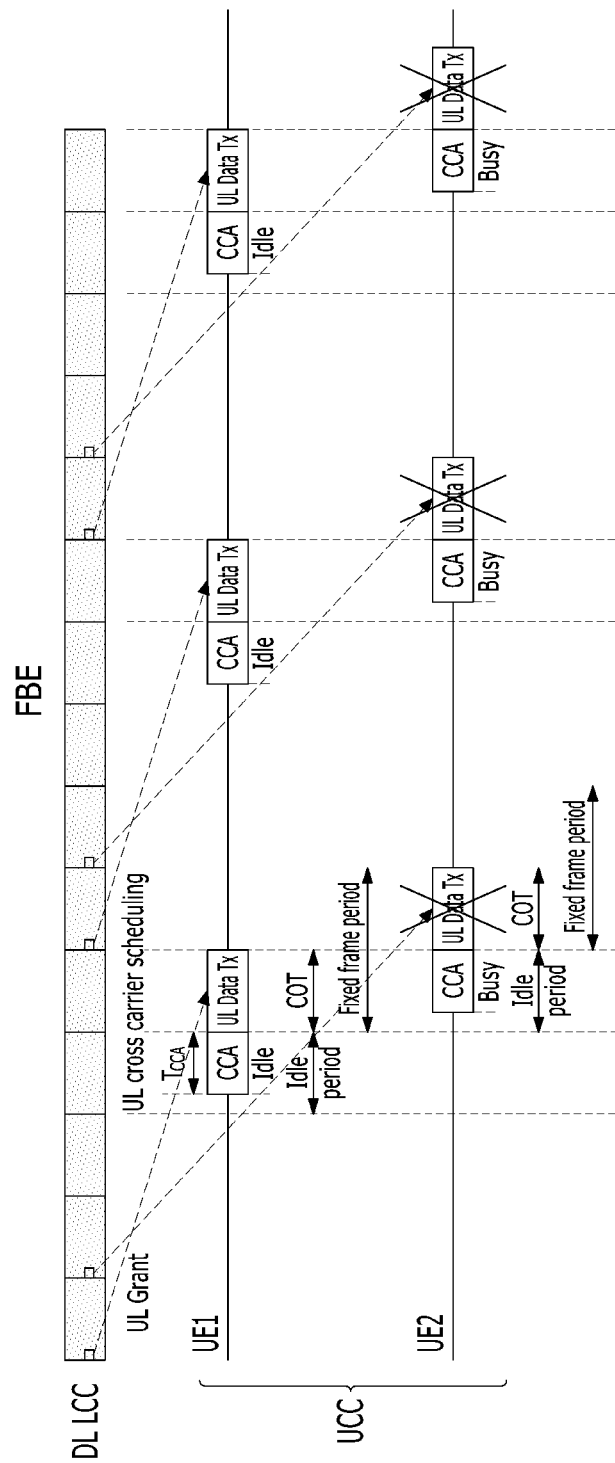
FIGS. 1A to 2B are schematic views showing a method for allocating uplink resources of an unlicensed band through a licensed band.

Hereinafter, exemplary embodiments of the present description will be described in detail with reference to the accompanying drawings so as to be easily practiced by those skilled in the art to which the present description pertains. However, the present description may be modified in various different forms, and is not limited to exemplary embodiments provided in the present specification. In addition, components unrelated to a description will be omitted in the accompanying drawings in order to clearly describe the present description, and similar reference numerals will be used to denote similar components throughout the present specification.

Throughout the present specification, a terminal may indicate a mobile station (MS), a mobile terminal (MT), an advanced mobile station (AMS), a high reliability mobile station (HR-MS), a subscriber station (SS), a portable subscriber station (PSS), an access terminal (AT), a user equipment (UE), a machine type communication (MTC) device, and the like, and may include all or some of functions of the MT, the MS, the AMS, the HR-MS, the SS, the PSS, the AT, the UE, and the like.

In addition, a base station (BS) may indicate an advanced base station (ABS), a high reliability base station (HR-BS), a node B, an evolved node B, (eNodeB), an access point (AP), a radio access station (RAS), a base transceiver station (BTS), a mobile multihop relay (MMR)-BS, a relay station (RS) serving as the base station, a relay node (RN) serving as the base station, an advanced relay station (ARS) serving as the base station, a high reliability relay station (HR-RS) serving as the base station, small base stations [femto base station (femto BS), a home node B (HNB), a home eNodeB (HeNB), a pico base station (pico BS), a macro base station (macro BS), a micro base station (micro BS), and the like], or the like, and may include all or some of functions of the ABS, the node B, the eNodeB, the AP, the RAS, the BTS, the MMR-BS, the RS, the RN, the ARS, the HR-RS, the small base stations, or the like.

A method for adjusting a contention window and a method for applying a backoff according to the present description may be applied to all apparatuses for performing a clear channel assessment (CCA) in the case in which a transmitting apparatus for performing a CCA accesses a channel in order to transmit data or a receiving apparatus accesses a channel in order to receive data. For example, the method for adjusting a contention window and the method for applying a backoff according to the present description may be applied to a CCA performed by a base station in order to transmit data to a terminal (transmit downlink data), a CCA performed by a base station in order to transmit data of a terminal (transmit uplink data), a CCA performed at the time of exchanging data between terminals or between apparatuses, a CCA performed by a terminal in order for the terminal to transmit data to a base station using resources allocated by the base station, or the like.

FIGS. 1A to 2B are schematic views showing a method for allocating uplink resources of an unlicensed band through a licensed band.

Figure 1B:
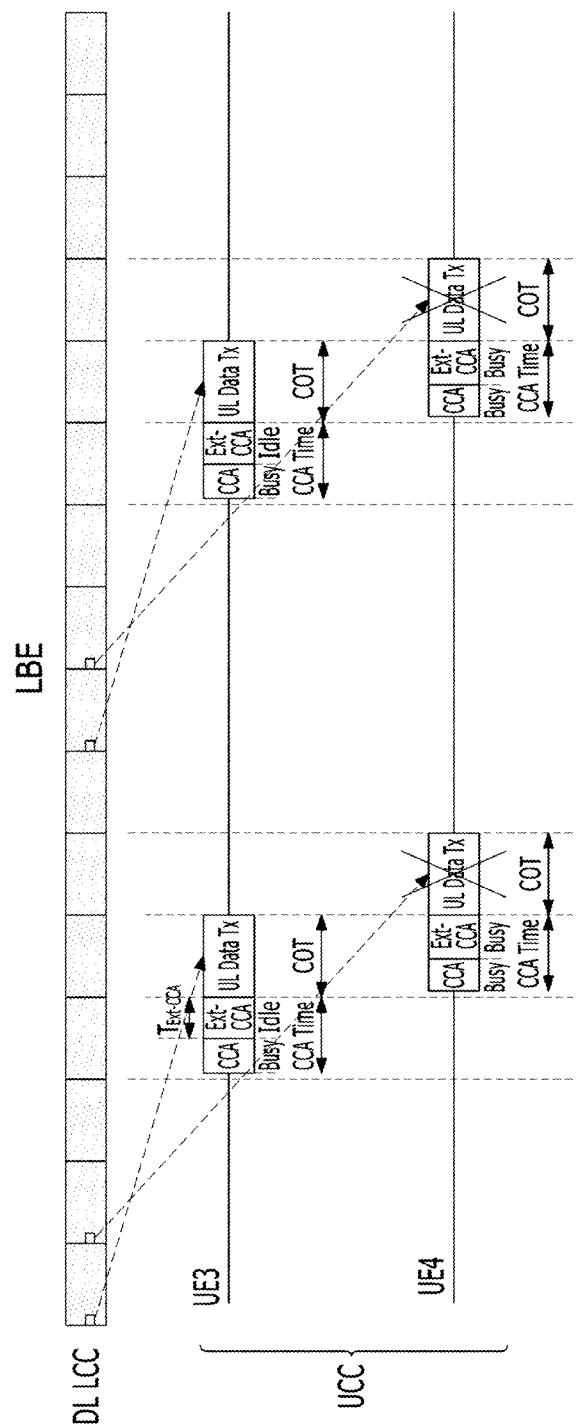
Figure 2A:
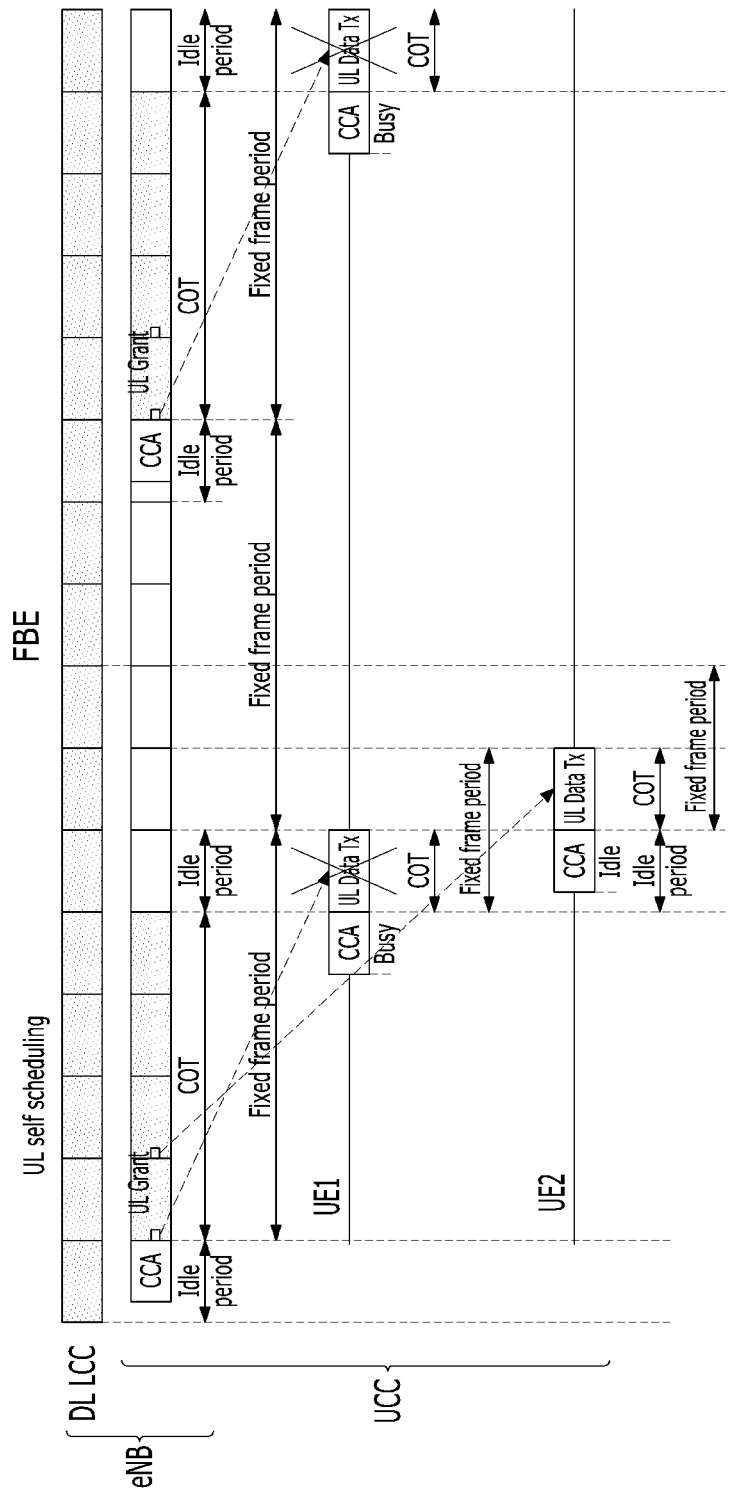
Figure 2B:
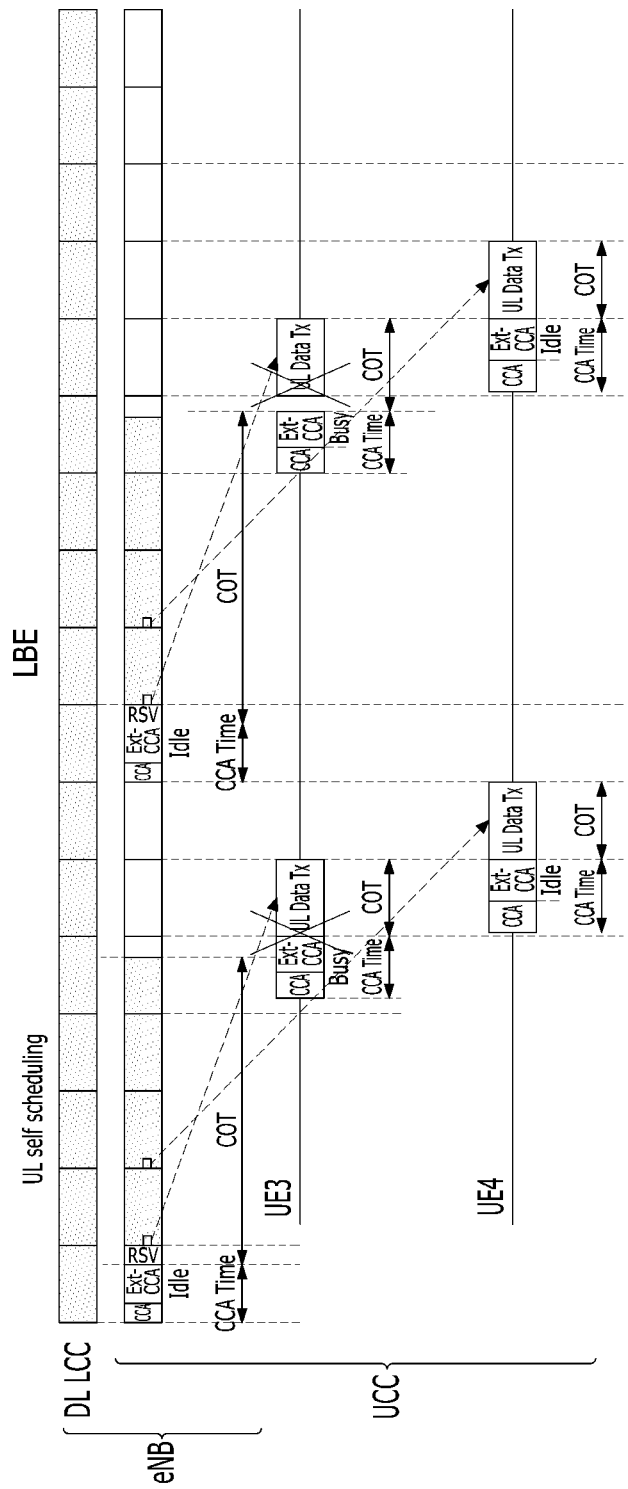

A frame based equipment (FBE) of FIGS. 1A and 1B and a load based equipment (LBE) of FIGS. 2A and 2B are channel access schemes defined in European telecommunications standards institute (ETSI) standards and $3^{rd}$ generation partnership project (3GPP) standards, and methods specified in these standards are applied as basic operations of these equipments. In addition, it is assumed that a channel occupancy time at the time of accessing a channel is 4 ms.

Referring to FIGS. 1A and 1B, a base station allocates resources to terminals through cross-carrier scheduling (an uplink grant (UL grant)). Then, at a point in time in which the terminals transmit data to the base station, specific terminals UE1 and UE3 may occupy a channel to transmit data, and other terminals UE2 and UE4 decide that as a result of CCA, the channel is occupied by other apparatuses and do not transmit data. Here, the point in time in which the terminals transmit the data to the base station is a point in time in which four subframes elapse after transmission of a reference uplink grant in the case in which a primary cell (PCell) is a frequency division duplex (FDD) and a point in time in which four to seven subframes elapse depending on uplink/downlink (UL/DL) configurations in the case in which a PCell is a time division duplex (TDD).

Referring to FIGS. 2A and 2B, a base station allocates resources to terminals through self-scheduling. Also in this case, during a period in which specific terminals UE1 and UE3 transmit data, terminals UE2 and UE4 performing a CCA decide that a channel is occupied by other apparatuses and do not transmit data.

Figure 3:
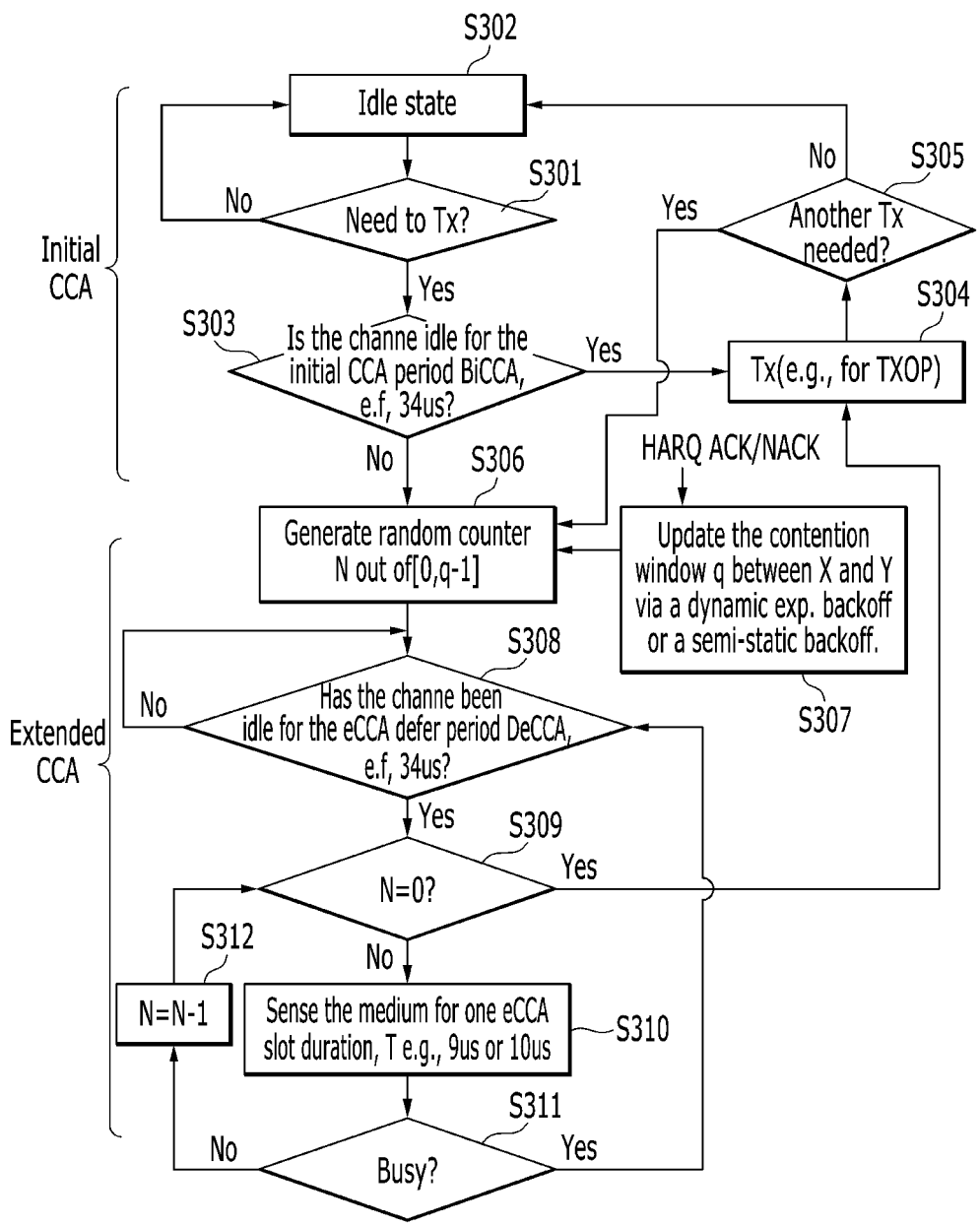
FIG. 3 is a flow chart showing a channel access method of an unlicensed band according to an exemplary embodiment.

FIG. 3 is a flow chart showing a channel access method of an unlicensed band according to an exemplary embodiment.

The channel access method of an unlicensed band shown in FIG. 3 is a method for allowing the terminals such as UE2 and UE4 of FIGS. 1A to 2B to occupy the channel after the CCA.

Referring to FIG. 3, a communication apparatus such as a base station, a terminal, or the like, that is to transmit data through a channel of the unlicensed band may perform an initial CCA and an extended CCA to occupy the channel of the unlicensed band.

First, the communication apparatus determines whether there is a need to transmit data (S301), and keeps an idle state when there is no need to transmit the data (S302). When the data transmission request occurs, the communication apparatus performs an initial CCA (S303). When the channel is idle during the initial CCA period (BiCCA) (for example, 34 us), the communication apparatus transmits the data (S304). Then, the communication apparatus determines whether another data transmission is needed (S305), and returns the idle state if there is no another data transmission request.

However, when the channel is determined to be busy (or used, occupied; hereafter "BUSY") during the initial CCA period or there is another data transmission request, the communication apparatus performs an extended CCA. For the extended CCA, the communication apparatus selects a random counter N between 0 and q−1 where the q is a contention window value (S306). At this time, the contention window value q may be updated between X and Y by using a dynamic backoff or semi-static backoff (S307). And a HARQ ACK/NACK may be used for the update of the contention window.

Then, the communication apparatus determines whether the channel is idle during the extended CCA defer period (DeCCA) (S308). If the channel is idle, the communication apparatus determines whether the random counter N is 0 (S309). If the random counter N is 0, the communication apparatus transmits the data (S304). However, if the random counter N is not 0, the communication apparatus senses the channel during one extended CCA slot duration (for example, 9 us or 10 us) (S310). Then, the communication apparatus decreases the random counter N as 1 if the channel is determined not busy (S311). If the channel is determined to be busy, the communication apparatus returns to the S308 (S312).

In FIG. 3, a defer period (DP) is an additional sensing section including at least one CCA slot. In addition, depending on whether or not the previously transmitted data are successfully transmitted, a contention window q may be adjusted and a backoff may be dynamically or semi-statically applied in channel accessing/occupying processes. However, it is difficult to adjust the contention window and dynamically or semi-statically apply the backoff due to a problem that it is unclearly shown whether or not the data are successfully transmitted (for example, ACKs/NACKs received from a plurality of apparatuses, reception of an ACK/NACK after several subframes (that is, several milliseconds), or the like).

Figure 4A:
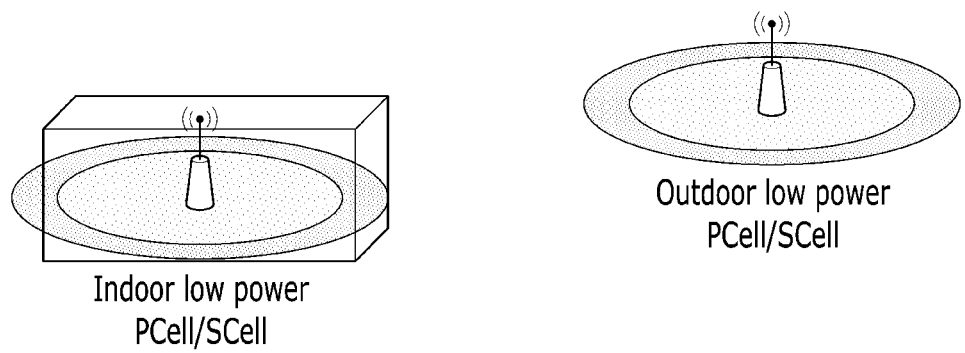
FIGS. 4A to 4C are layout views showing a mobile communication system in which an UCC is configured and operated.
Figure 4B:
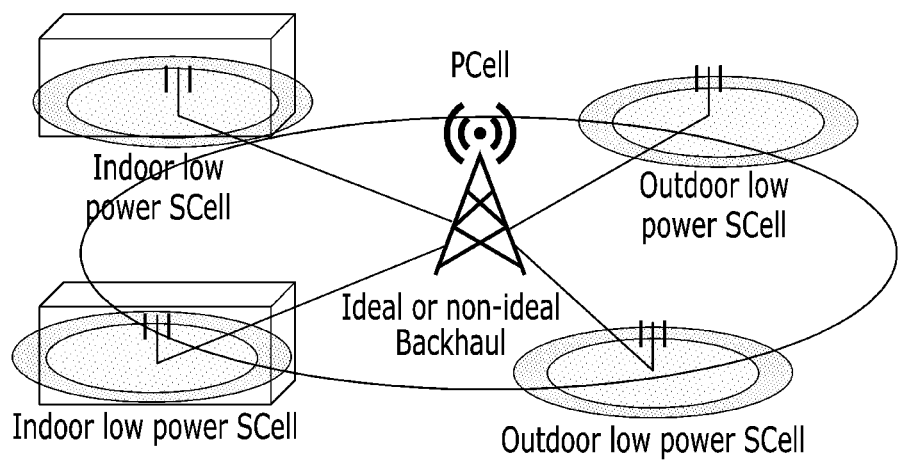
Figure 4C:
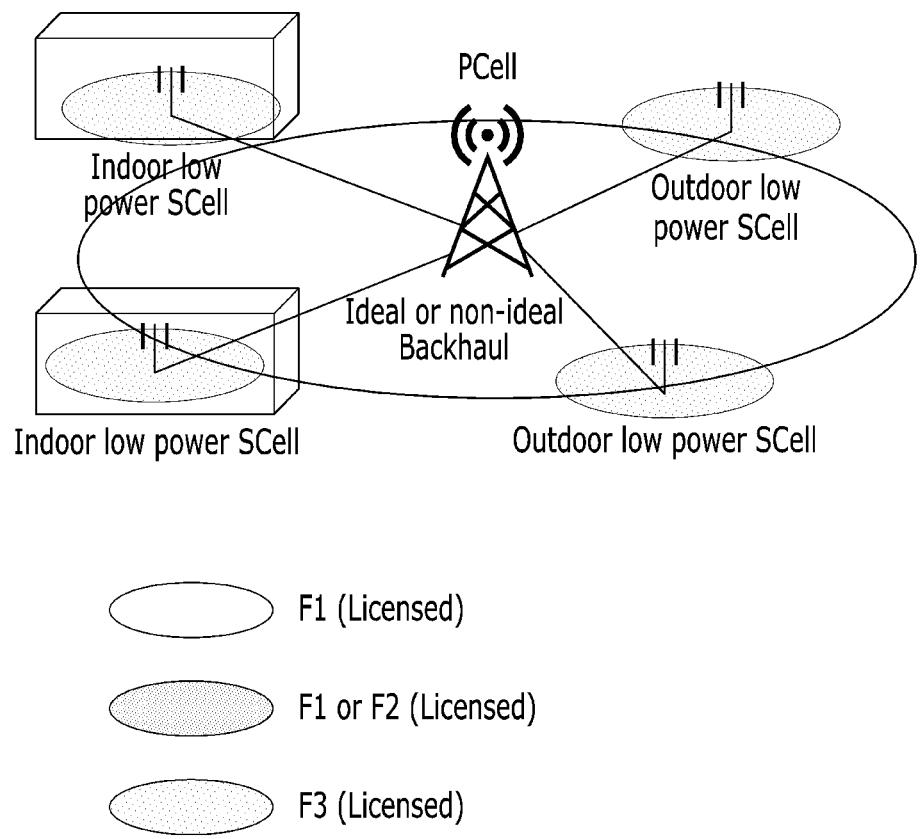

FIGS. 4A to 4C are layout views showing a mobile communication system in which a UCC is configured and operated.

Referring to FIG. 4A, indoor and outdoor low power cells in which an LCC and a UCC are operated in one cell are shown. In each case, a PCell may be a macro cell, and an SCell (a secondary cell) may be co-located or non-co-located with the PCell.

Referring to FIG. 4B, a PCell in which an LCC is operated and (low power) SCells in which an LCC and a UCC are operated are shown. The respective SCells in which the LCC and the UCC are operated may be disposed to be indoor and outdoor. The PCell may be a macro cell or a small cell, and the SCells in which the LCC is operated and the SCells in which the UCC is operated may be co-located or non-co-located with each other.

Referring to FIG. 4C, a PCell in which an LCC is operated and (low power) SCells in which an LCC is operated are shown. The SCells in which the UCC is operated may be disposed to be indoor and outdoor, and the PCell in which the LCC is operated may be a macro cell or a small cell.

Figure 5:
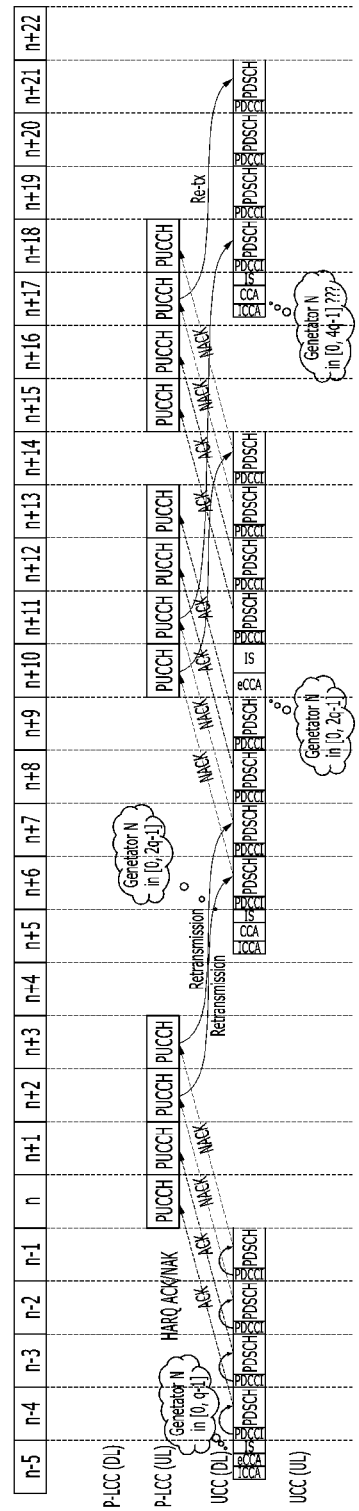
FIG. 5 is a schematic view showing a clear channel assessment (CCA) by adjustment of a contention window according to an exemplary embodiment.

FIG. 5 is a schematic view showing a CCA by adjustment of a contention window according to an exemplary embodiment.

In FIG. 5, a base station performs a CCA in order to transmit data through a UCC, and a terminal transmits a hybrid automatic retransmission request (HARQ) acknowledge (ACK)/negative ACK (NACK) for the data received from the base station to the base station through a P-LCC. Referring to FIG. 5, the terminal transmits NACKs for data transmitted in a subframe n−2 and a subframe n−1 to the base station (in a subframe n+2 and a subframe n+3), and the base station retransmits data corresponding to the NACKs in a subframe n+6 and a subframe n+7. Then, the terminal informs NACKs for the retransmitted data, and the base station retransmits the retransmitted data in subframes n+14 and n+18. In this case, the base station may perform an extended CCA by selecting a CCA performing slot N before performing the CCA. In the case in which a channel is occupied through the CCA, it is assumed that a channel occupancy time (COT) is 4 ms.

The base station performs an initial CCA (or an extended CCA), occupies a channel, and then transmits an initial signal (IS) for transmitting data in a subframe n−5 in order to transmit data in a subframe n−4. Here, as N selected when the extended CCA is performed after the initial CCA, one in a contention window (0 to q−1) may be arbitrarily selected. In the case in which the transmission of the data after the initial CCA is not successful (for example, reception of the HARQ NACK), the base station updates q in the previous subframe (a subframe n+5) of a subframe for retransmission of the data, and performs the extended CCA using N selected among 0 to updated q−1. When it is decided that data that are to be transmitted at a point in time (for example, a subframe n+10) in which a maximum COT expires are further present, the base station may newly perform the CCA in order to transmit the data. In this case, the initial CCA may be omitted. In the case in which the initial CCA is omitted, a transmitting apparatus reapplies the contention windows 0 to q−1 applied at the time of the previous CCA to select N. In addition, a COT section includes initial data transmission, data retransmission corresponding to the HARQ NACK, new data transmission corresponding to the HARQ ACK, and the like. The contention window may be updated depending on the following Equation 1.

$$q = \max\{\min(kq, Y), X\} \quad \text{(Equation 1)}$$

In Equation 1, q, which is a contention window for N selecting an extended CCA section (a CCA slot) depending on a frequency regulation at the time of operating an unlicensed band, indicates a maximum value among N values. k is an any value (k≥0), X is a minimum value of the contention window, and Y is a maximum value of the contention window. Y is larger than or equal to X (Y≥X).

q may be changed depending on COT. For example, q may be determined to satisfy the following Equation 2.

$$q \geq COT \times 32/13 \quad \text{(Equation 2)}$$

In Equation 2, COT is represented by milliseconds. Alternatively, q may be determined to be any value unrelated to COT or be determined to be one of predetermined values (for example, one of 4, 8, and 16) and be determined to be a value between X and Y.

In the case in which k is greater than 1 (k>1), the contention window is updated to a value larger than the previous contention window. In the case in which k is less than 1 (k<1), the contention window is updated to a value smaller than the previous contention window. In the case in which k is equal to 0 (k=0), the contention window is updated to a minimum value (that is, k=X) or is initialized. In the case in which k is equal to 1 (k=1), the contention window is not updated, and the former contention window value may be reused.

X may be determined depending on the following Equation 3.

$$X = \lceil COT \times 32/13 \rceil \quad \text{(Equation 3)}$$

Alternatively, X may be the smallest natural number of natural numbers or any value larger than a minimum value (4, 16, or the like) defined in a frequency regulation of an unlicensed band. Alternatively, X may be any number larger than the minimum value defined in the frequency regulation of the unlicensed band.

Y may be the largest natural number of natural numbers or any value smaller than a maximum value (32, 1024, or the like) defined in the frequency regulation of the unlicensed band.

Meanwhile, in the case in which X and Y are equal to each other (X=Y), k is equal to 1 (k=1), and the following Equation 4 is satisfied.

$$q=X=Y \quad \text{(Equation 4)}$$

The contention window may be updated depending on one or a combination of two or more of the following methods. In a method for updating the contention window, k may be determined to be any value. The update of the contention window may include maintenance, increase, decrease, reset of the previous contention window value to an initial value, and the like. In the following description, m indicates the number of HARQ ACKs, and n indicates the number of HARQ NACKs. m and n, which are the numbers of HARQ ACKs/NACKs, are the numbers of HARQ ACKs/NACKs received from after a specific time until before the CCA is performed.

- Method for maintaining the previous q regardless of HARQ ACKs/NACKs.
- Method for updating q regardless of HARQ ACKs/NACKs.
- Method for updating q when HARQ NACKs are received.
- Method for updating q when all of HARQ ACKs/NACKs for data transmission are HARQ NACKs.
- in the case in which the numbers of HARQ ACKs/NACKs for data transmission are m and n, respectively, a transmitting apparatus may determine whether or not q is updated by comparing m and n with each other. When k=1, the previous q may be maintained, when k>1, q may be increased, when 0<k<1, q may be decreased, and when k=0, q may be reset to an initial value.
- Method for updating q when m is a predetermined value or more or is the predetermined value or less in the case in which n=0 (in the case in which all of the received HARQ ACKs/NACKs are the HARQ ACKs).
- Method for updating q when n is a predetermined value or more or is the predetermined value or less in the case in which m=1 (in the case in which all of the received HARQ ACKs/NACKs are the HARQ NACKs).
- Method for updating q when a difference between m and n is a predetermined value or more or is the predetermined value or less or a ratio of m and n is a predetermined value or more in the case in which m>n (in the case in which the number of HARQ ACKs is more than that of HARQ NACKs). In this case, because the number of HARQ ACKs is more than that of HARQ NACKs, the q is decreased.
- Method for updating q when a difference between m and n is a predetermined value or more or is the predetermined value or less or a ratio of m and n is a predetermined value or more in the case in which m<n (in the case in which the number of HARQ NACKs is more than that of HARQ ACKs). In this case, because the number of HARQ NACKs is more than that of HARQ ACKs, the q is increased.
- Method for updating q in the case in which m=n (in the case in which the numbers of HARQ ACKs and HARQ NACKs are the same as each other).
- Method for updating q when a ratio of HARQ ACKs and HARQ NACKs such as m/n, n/m, n/(m+n), m/(m+n), or the like, is a predetermined value or more or is the predetermined value or less.
- Method for updating q when the number of m is a predetermined value or more or is the predetermined value or less.
- Method for updating q when the number of n is a predetermined value or more or is the predetermined value or less.
- Method for updating q when each of the numbers of m and n is a predetermined value or more or is the predetermined value or less.
- Method for updating q when an HARQ NACK for data to which the most robust MCS is applied is received.

In this case, when an HARQ ACK is received after the data to which the most robust MCS is applied, the contention window value q may be maintained or be decreased (or be reset to an initial value), and when an HARQ NACK is received after the data to which the most robust MCS is applied, the q value may be increased. In addition, in this case, it may be determined whether or not q is updated depending on the number of received HARQ ACKs, the number of received HARQ NACKs, or a ratio of the numbers of HARQ ACKs/NACKs.

- Method for updating q depending on HARQ ACKs/NACKs for data transmitted in specific subframes (for example, some first subframe(s), some last subframe(s), or the like, of an occupied channel) positioned in a COT.
- Method for updating q when at least one HARQ NACK is received and performing retransmission of data in a reoccupied channel.

In the present description, in the case in which an HARQ ACK/NACK are mixed with each other and are reported from one receiving apparatus, the HARQ ACK/NACK reported from the corresponding receiving apparatus may not be used to determine whether or not the contention window is updated. In addition, HARQ ACKs/NACKs received after q is updated may not be used to determine whether or not the contention window is updated. HARQ ACKs/NACKs reported before a specific time may not be used to determine whether or not the contention window is updated.

When the terminal is about to transmit the data to the base station through uplink resources, the base station may inform the terminal of an updated q value, a k value for updating q, or the like, at the time of allocating resources for data retransmission, and then the terminal, which is received the q value, the k value for updating q, or the like, may perform a CCA. Alternatively, the update of the contention window for the data retransmission of the terminal may be performed on the basis of a pre-configured q or k value between the terminal and the base station. Alternatively, the terminal may determine the update of the contention window depending on whether or not an MCS applied previously is changed. For example, in the case in which the MCS is changed from a less robust MCS to a more robust MCS or is changed from a more robust MCS to a less robust MCS, the terminal may update the contention window. In the case in which two or more uplink resources are allocated to the terminal (for example, one uplink resource is dedicated to the data retransmission and the other uplink resource is dedicated to initial transmission of the data), the update of the contention window may be separately determined for the respective uplink resources. When a time of a predetermined time or more is present from after the CCA until before uplink data transmission is performed (for example, from after an uplink grant (UL grant) until before a subframe k), the terminal may not perform any operation (for example, updating a contention window) for the corresponding time.

Meanwhile, the contention window may be updated depending on the following Equation 5.

$$q = \max\{\min(q+k, Y), X\}  \quad \text{(Equation 5)}$$

In the case in which Equation 5 is applied, q may be updated (increased, decreased, or maintained) to a value changed from the previous q by k. Alternatively, q is not updated on the basis of the HARQ ACKs/NACKs, but may also be updated depending on a channel access/occupancy or a data transmission result.

Hereinafter, a method for updating a contention window depending on a channel state will be described in detail. In a CCA performed for the purpose of the channel access/occupancy, a q value of a contention window may be updated depending on a measured channel state. For example, a parameter indicating the channel state and a predetermined value may be compared with each other, and the update of the contention window may be determined on the basis of a comparison result. Alternatively, the update of the contention window may be determined on the basis of the number of times by which the channel is occupied or the number of times by which the channel is not occupied after the CCA.

In the case in which a resource allocation scheme of the base station is self-scheduling (or self-carrier scheduling), resource allocation information for data transmission indicated through a physical downlink control channel (PDCCH) or (an enhanced PDCCH (EPDCCH)) is included in the same carrier as a carrier of the data transmission. Here, a case in which an HARQ ACK/NACK for the (E)PDCCH are not present may occur, and the terminal may receive data only in the case in which reception of the (E)PDCCH is successful. Therefore, it is difficult for the base station to update the contention window on the basis of the HARQ ACK/NACK. That is, because a case in which the terminal cannot receive the data may occur when the (E)PDCCH is not successfully received, the terminal may ignore the HARQ ACK/NACK for the corresponding data or may determine the received HARQ ACK/NACK as a NACK when performing updating the contention window. The transmitting apparatus receiving a feedback for the data from the receiving apparatus in the self-scheduling may decide that it is difficult to correctly transmit the data due to a bad channel state, and may apply a more robust MCS, may not update the contention window, or may reset the contention window to an initial contention window to perform the CCA.

In the case in which a resource allocation scheme of the base station is cross-carrier scheduling, the base station may update the contention window on the basis of the HARQ ACK/NACK received from the receiving apparatus.

Meanwhile, the base station may add resource allocation for retransmission to the HARQ ACK/NACK. In addition, information on the updated contention window may be included in resource allocation for data transmission or be included in resource allocation for data retransmission. Then, the base station may perform a CCA for retransmission on the basis of the updated contention window. Meanwhile, the base station may not update the contention window or may reset the contention window to an initial value in the case in which resource allocation is not resource allocation for retransmission or resources for retransmission are not allocated. Alternatively, the base station may inform the terminal of N selected within the contention window and configure the CCA to be performed for N CCA slots when resources are allocated, and the terminal may performs the CCA for N CCA slots.

Hereinafter, a channel access method depending on priorities of transmitted traffics will be described in detail. In traffics transmitted in an unlicensed band channel, priorities may be set depending on characteristics, a kind, or the like, of traffics, and a channel access may be performed depending on the set priorities. An example thereof includes FBE and LBE options NB of ETSI, LBT categories 2, 3, and 4 of 3GPP, or the like. In the present description, priorities may be set as follows depending on characteristics or a kind of traffics.

Priorities depending on a kind of traffics such as a video, an audio, a general traffic, and the like Priorities depending on whether a channel is a control channel or a data channel Priorities depending on a detailed kind of channels such as a PDCCH, a PDSCH, a PUSCH, a PUCCH, and the like Priorities depending on the purposes of transmitted data, such as a discovery reference signal (DRS), a PDSCH, and the like CCA parameters, channel access methods, and the like, may be independently applied depending on the respective priorities.

Classes (LBT priority classes) of priorities are set, and CCA parameters are determined for each set class, such that a channel access may be performed. Table Table 1 represents CCA parameters for a channel access depending on priorities.

TABLE 1

| LBT priority class | $CW_{min}$ (X) | $CW_{max}$ (Y) |
|---|---|---|
| 1 | 3 | 7 |
| 2 | 7 | 15 |
| 3 | 15 | 63 |
| 4 | 15 | 1023 |

Referring to Table 1, $CW_{min}$ and $CW_{max}$ are a minimum contention window size and a maximum contention window size, respectively, and n is the number of CCA slots included in a defer period (DP). For example, since $CW_{min}$, $CW_{max}$, and n of class 1 are smaller than those of another class (class 2, 3, or 4), the probability to succeed in a channel access is high in class 1. Other parameters (for example, an energy detection threshold, or the like) for the CCA that are not represented in Table 1 may also be differently set for each class. In addition, the CCA parameters depending on the priority classes may be applied to determination, re-determination, adjustment, and the like, of the CCA slots described above, and may also be applied to other CCA methods that are not described in the present description. In the case in which traffics corresponding to a plurality of classes are transmitted, CCA parameters applied for each class may be used. However, in the case in which the traffics corresponding to the plurality of classes are transmitted, a method for applying the CCA parameters may be additionally required.

Hereinafter, a case in which traffics included in two or more classes are served on the basis of priorities will be described with reference to FIGS. 6A to 6C. In FIGS. 6A to 6C, J and K indicate LBT quality class level (QCL) parameters. In the case in which K is greater than J (K>J), both of an initial CCA and an extended CCA may be performed, and in the case in which K is less than J or is equal to J (K≤J), only the extended CCA may be performed without performing the initial CCA.

In the present description, the determination/usage of the parameter (for example, CCA parameter, channel occupation time, and the like) for data transmission through the channel occupancy/use may be performed by the transmitting apparatus (for example, the base station, the terminal, or the like) attempting to transmit traffic. Alternatively, when the base station determines the parameter for channel occupancy/use of the terminal and allocates the uplink resources to the terminal, the base station may transfer the parameter according to the type (or class) of the allocated traffic.

Then, the terminal that has received the parameter for the channel occupancy/use from the base station may perform a CCA and transmit data by using the received parameter. If the base station does not indicate all or some parameters for the channel occupancy/use or the terminal is not indicated all or some parameters by the base station, the following method may be applied. Or the following method may be applied to all or some parameters which are not indicated to the terminal. The transmitting apparatus may transmit the traffic through the channel occupied by performing the CCA using the parameter for channel occupancy where the parameter is correspond to traffic class. At this time, traffic having the same class with the parameter used for the CCA may be transmitted, or the traffic and traffic having different class with the parameter may be transmitted during the allowed channel occupancy time.

Figure 6:
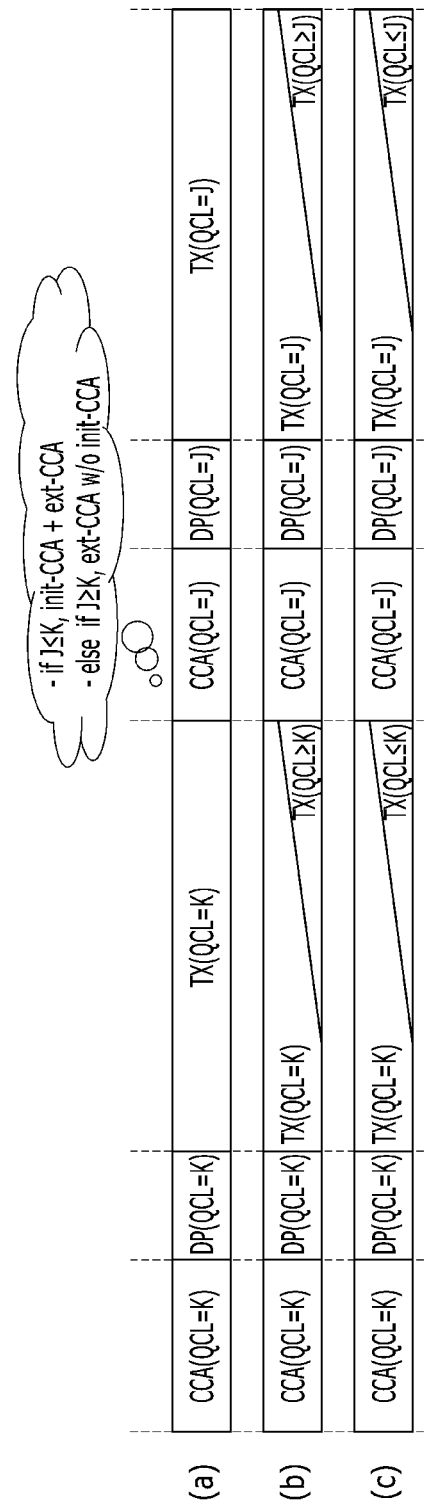
FIG. 6 is a schematic view showing a channel access method based on priorities according to an exemplary embodiment.

Referring to FIG. 6 (a), only the traffics of the same class are transmitted through the channel occupied after the CCA. In this case, channel occupancy times of each class may be set to be different from each other, and data may be transmitted for a channel occupancy times corresponding to the class. When attempting to transmit data, the transmitting apparatus occupies the channel by performing the CCA and transmits the data through the occupied channel. If there is no traffic having the same class with the parameter used for the CCA in the allowed channel occupancy time, the transmitting apparatus may not use the occupied channel any more, or may transmit data during the remaining channel occupancy time regardless of the traffic class. Referring to FIG. 6 (b), the transmitting apparatus (for example base station or terminal) accesses/occupies a channel using a CCA corresponding to a class having a relatively low priority and then transmits different traffics of different classes through the occupied channel. Alternatively, referring to FIG. 6 (c), the transmitting apparatus accesses/occupies a channel using a CCA corresponding to a class having a relatively high priority and then transmits different traffics of different classes through the occupied channel.

For example, in the case in which the transmitting apparatus transmits different traffics corresponding to priority classes 1 and 3, the transmitting apparatus may access a channel using a CCA corresponding to the priority class 1 and occupy the channel within the channel occupancy time corresponding to the priority class 1, and then transmits traffics corresponding to the priority classes 1 and 3 through the occupied channel (See (c)). Alternatively, in the case in which the transmitting apparatus transmits different traffics corresponding to priority classes 1 and 3, the transmitting apparatus may access a channel using a CCA corresponding to the priority class 3 and occupy the channel within the channel occupancy time corresponding to the priority class 3, and then transmits traffics corresponding to the priority classes 1 and 3 through the occupied channel (See (b)).

Here, in the case in which data are transmitted over one or more TTIs, all of classes of data transmitted in predetermined TTIs (for example, an initial TTI, some front TTIs, some last TTIs, all TTIs, or some TTIs) may be set to 1 or the number or a ratio of classes of data transmitted in the predetermined TTIs may be predetermined. That is, in the COT of the occupied channel, the transmitting apparatus preferentially transmits data corresponding to the priority class for the channel occupancy. Then, there is no data corresponding to the priority class for the channel occupancy (or, all data corresponding to the priority class for the channel occupancy are transmitted), data corresponding to the different priority class may be transmitted in the same TTI or the next TTI of the allowed COT.

In the case in which the previous CCA slot needs to be re-determined or adjusted (for example, updating based on HARQ ACK/NACK), the re-determination or adjustment method for the latest CCA slot may be applied to the re-determination or adjustment for the CCA parameters corresponding to the different priority class as well as the CCA parameter for each priority class used for the latest CCA. Alternatively, the channel access may be tried by using the CCA parameter, so that only traffics having the same priority as that of the previously transmitted traffics are transmitted. In this case, traffics having the same priority may be transmitted in the entirety of the occupied channel, and be transmitted in some TTIs of the occupied channel. Alternatively, traffics having the same priority may be transmitted in only the initial TTI or each TTI may include at least one traffic having the same priority. That is, the traffic having the different priority may be transmitted after the traffic having the same priority is transmitted.

In order for different traffics having different priorities to be served (or exchanged) in a channel occupied through a new channel occupying attempt, the transmitting apparatus may perform the CCA using a parameter of a class having the highest priority or a class having the lowest priority.

In the case in which the transmitting apparatus performs the CCA using the parameter corresponding to the class having the highest priority, in the predetermined TTIs (the initial TTI, some front TTIs, all TTI, or the like in the COT), a predetermined number or a predetermined ratio of data of the highest class may be served. That is, the data of the higher class may be preferentially served, and after that time (in the case in which there is no data having a corresponding priority class) the data of the lower class may be served sequentially in the same TTI or the next TTI. Here, in the case in which the transmitting apparatus performs the CCA using the parameter corresponding to the class having the highest priority, the transmitting apparatus may perform the initial CCA and the extended CCA, and in the case in which the transmitting apparatus performs the CCA using parameters corresponding to the remaining classes, the transmitting apparatus may perform only the extended CCA.

In the case in which the transmitting apparatus performs the CCA using the parameter of the relatively low priority class, the transmitting apparatus may occupy the idle channel and transmit the traffic in the COT corresponding to the relatively low priority class regardless of the priority.

In the case in which the channel is determined to be "busy" and the CCA slot is frozen during a period in which the transmitting apparatus performs the CCA using the parameter corresponding to the class having the relatively low priority, the transmitting apparatus may perform the CCA using the parameter corresponding to the class having the highest priority. Then, in the case in which the transmitting apparatus again occupies the channel, the transmitting apparatus may 1) reuse the frozen CCA slot, 2) perform only the extended CCA (in this case, the CCA slot, or the like, is again determined), or perform the initial CCA and the extended CCA using the parameter corresponding to the class having the low priority (in this case, the CCA slot, or the like, is again determined).

Meanwhile, a channel access method may be changed depending on the purposes of traffics (for example, data for controlling a service, data corresponding to a service, or the like). For example, transmitted data may include a discovery reference signal (DRS), a PUCCH, a PUSCH, a PDSCH, or a PDCCH. The PDSCH is a channel used when the base station transmits data to the terminal, the PUSCH is a channel used when the terminal transmits data to the base station, and the PDCCH is a channel for transferring control information including downlink resource allocation information, uplink resource allocation information, or the like, from the base station to the terminal. The DRS, also known as discovery signal (DS), is a channel including control information for cell identification, channel quality measurement, or the like. Generally, the PDCCH may be transmitted in the same occupancy section as that of the PDSCH through the channel occupied after the CCA. A CCA for the PDCCH may include a CCA for transmitting an uplink grant and a CCA for transmitting uplink data. The DRS may be transmitted through an independent CCA without the PDCCH/PDSCH/PUSCH. Also in this case, the CCA may be performed. Table 2 represents examples of channel access methods depending on the purposes of traffics, and in the present description, the base station may apply one or a combination of two or more of channel access methods depending on the purposes of traffics to be described below. In Table 2, it is assumed that priorities of channel access methods have a sequence of 1>2>3.

TABLE 2

| Purpose | Channel Access Method | Typical Example |
|---|---|---|
| service control1 | 1 | DRS |
| service control2 | 2 | PDCCH |
| data transmission | 3 | PDSCH, PUSCH | in the case in which first traffics to which a channel access method 1 is applied and second traffics to which a channel access method 2 or 3 is applied are simultaneously transmitted, a channel access may be attempted using the channel access method 1 having the highest channel access probability. In the case in which data are transmitted through at least one TTI included in the channel occupied after the CCA, a predetermined number or ratio or more of first traffics may be included in the predetermined TTIs (the initial TTI, some front TTIs, or the like).

in the case in which the first traffics to which the channel access method 1 is applied and the second traffics to which the channel access method 2 or 3 is applied are simultaneously transmitted, a channel access may be attempted using the channel access method 2 or 3 having a relatively low channel access probability. In the case in which the channel access method 3 is used, all of traffics corresponding to the channel access method 1 to 3 may be transmitted within the allowed COT corresponding to the channel access method 3. In the case in which the channel access method 2 is used, traffics corresponding to the channel access method 1 and 2 may be transmitted. Here, in the case in which failure occurs in occupancy of the channel (in the case in which the channel is being used, or the lie) or failure occurs in transmission of the traffics (failure of transmission due to collision, or the like), transmission of data corresponding to a channel access method having a low probability may be withheld (or deferred), and a channel access may be again attempted using a channel access method having a high probability. For example, a channel may be occupied by applying the channel access method 1, and transmission of the first traffics may be ensured. For example, whenever the DRS and the PDSCH (and/or the PDCCH) are transmitted, different channel access methods may be used. For example, in the case in which only the DRS is transmitted, the channel access method 1 may be used, and in the case in which only the PDSCH is transmitted, the channel access method 2 or 3 may be used. In the case in which the channel access method 2 is used, the PDCCH and the PDSCH may be transmitted, and in the case in which the channel access method 3 is used, only the PDSCH may be transmitted. Also in the case in which the DRS and the PDSCH are simultaneously transmitted, the channel access method 2 or 3 may be used. Also in this case, when the channel access method 2 is used, the PDCCH and the PDSCH may be transmitted together with each other, and when the channel access method 3 is used, only the PDSCH may be transmitted. In addition, in the case in which the remaining CCA slot is generated due to the failure in the occupancy of the channel, 1) the channel may be again occupied by again performing the CCA for the left CCA slot or 2) the channel access method (for example, the channel access method 1) having a high probability may be used.

here, traffics to which different channel access methods are applied may be limited so as not to be simultaneously transmitted.

in the case in which the CCA slot is re-determined or adjusted, a contention window value of the previous CCA slot may be reused regardless of a channel access method corresponding to traffics transmitted from the recent CCA. Alternatively, only traffics corresponding to the same channel access method as the channel access method of the previously transmitted traffics may be transmitted. After occupancy of the channel is newly attempted, traffics corresponding to a plurality of channel access methods may be transmitted after the CCA performed by applying the channel access method having the highest or lowest priority.

Meanwhile, in the case in which the transmitting apparatus performs the CCA in order to occupy the channel, the channel may not be occupied in a time required for transmitting data (that is, a point in time in which the channel should be occupied). To this end, the data may be transmitted from a channel occupancy point in time. However, since the data are transmitted in a subframe unit or a slot or OFDM symbol unit in 3GPP LTE, the data may not be transmitted in a subframe or a slot or an OFDM symbol within the occupied channel.

FIGS. 7A to 7D are schematic views showing a method for transmitting data depending on termination of a CCA according to an exemplary embodiment.

Referring to FIGS. 7A to 7D, a periodically generated DRS has been used as an example of the traffic transmitted after the CCA. However, the example of the traffic transmitted after the CCA is not limited thereto (that is, the method for transmitting data depending on termination of a CCA described with reference to FIGS. 7A and 7D may be applied to all data transmitted depending on timing, such as the PUSCH, the subframe, the slot, the OFDM symbol, and the like, transmitted after the uplink grant).

Referring to FIGS. 7A to 7D, the base station may transmit the DRS depending on a predetermined period, and perform the CCA before transmitting the DRS. In the case in which a CCA result channel is determined to be "idle", the base station transmits the DRS, and in the case in which the CCA result channel is determined to be "busy" or "occupied", the base station again attempts the CCA. In the case in which the channel is idle after the CCA is again attempted, the base station may transmit the traffics. In FIGS. 7A to 7D, the base station may perform the CCA depending on a DRS measurement timing configuration (DMTC) and then transmit the DRS to the terminal. That is, the base station may transmit the DRS in a DMTC period, adjusts a DMTC offset before the base station transmits the DRS, and transmits the DRS for a DRS occasion duration, and the DRS occasion duration is included in a DRS measurement time (or DMTC window; hereafter referred to as "DMTC window"). Since the base station performs the CCA, it may implement LBT. The base station may perform transmission of at least one DRS in the DMTC window of the occupied channel. When the base station does not transmit the DRS within the DMTC window due to a situation of the channel (for example, a CCA performing point in time, a maximum channel occupancy time, or the like) (that is, when the DMTC window is terminated before the DRS is transmitted), the base station may extend the DMTC window.

Figure 7:
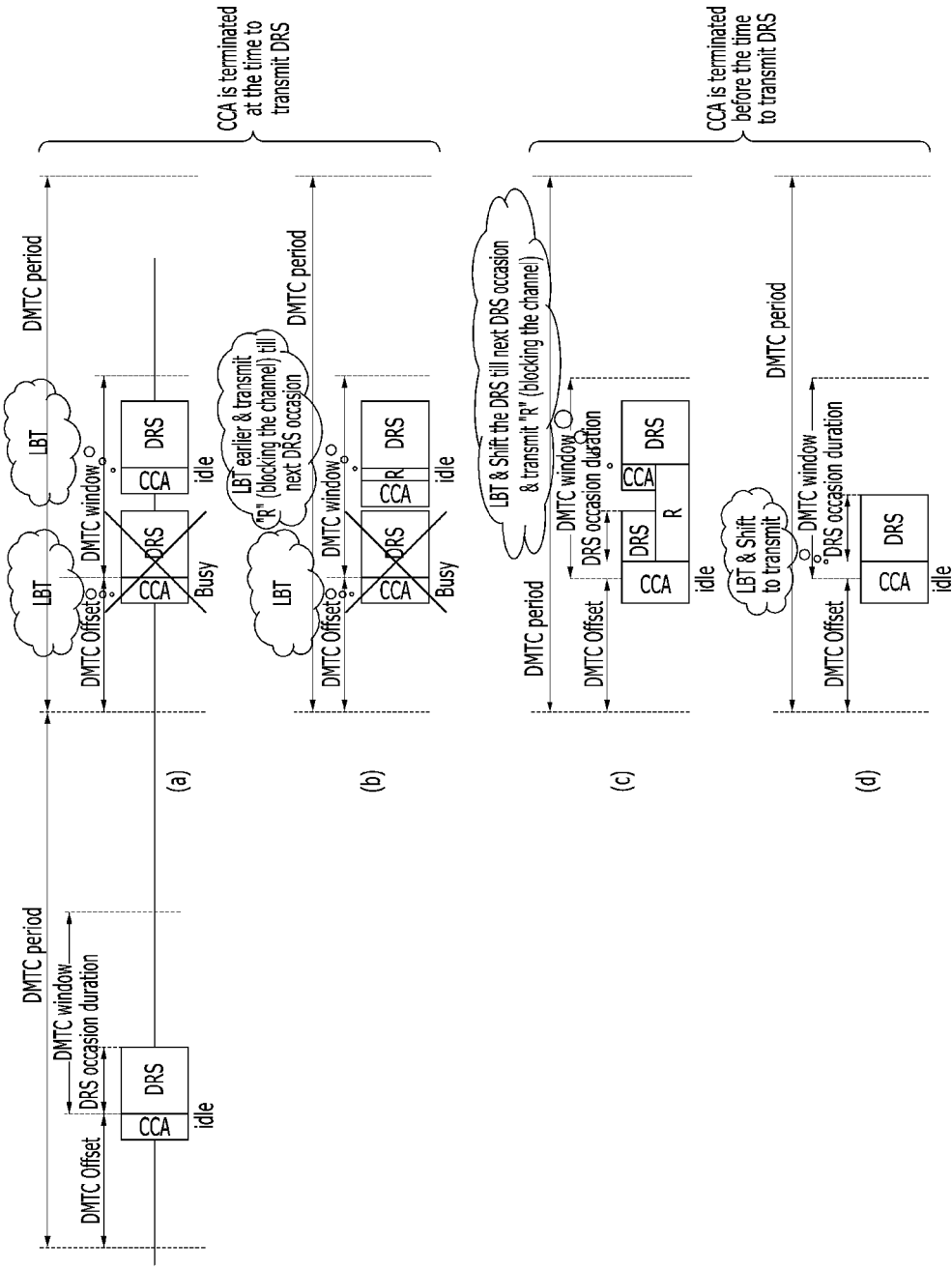
FIG. 7 is a schematic view showing a method for transmitting data depending on termination of a CCA according to an exemplary embodiment.

Referring to FIG. 7 (a), the base station failing in the occupancy of the channel in the initial CCA again performs the CCA, and transmits the DRS when the channel is determined to be idle. Here, the CCA is again performed within only the DMTC window, or the number of times by which the CCA is again performed may be limited.

Referring to FIG. 7 (b), since the channel is busy or occupied after the CCA, the base station may again attempt the CCA, and slightly move up the next CCA point in time as compared with FIG. 7 (a). For example, the base station may arbitrarily select a CCA performing point in time depending on a predetermined CCA performing point in time, and a channel occupancy probability may become high. In addition, the base station may transmit a signal "R" (R≥0) from after the CCA until before the transmission of the data, thereby preventing the channel from being occupied by other apparatuses (LBT earlier & transmit "R"). Here, in the case in which a maximum size (or a maximum time) of the signal "R" is limited, the transmitting apparatus may adjust a CCA performing time to allow the signal "R" to be transmitted until before the transmission of the data or may additionally perform the CCA after termination of transmission of the signal "R".

In the present description, the transmitting apparatus may determine a CCA start point in time ($T_s$) in consideration of a CCA performing-possible time ($T_c$) so that performing of the CCA may be completed before a data transmission point in time ($T_d$). A relationship between the data transmission point in time ($T_d$), the CCA performing-possible time ($T_c$), and the CCA start point in time ($T_s$) is represented by the following Equation 6.

$$T_d - T_c \geq T_s \quad \text{(Equation 6)}$$

Meanwhile, in the case in which the transmitting apparatus does not terminate the CCA until the data transmission point in time, the transmitting apparatus may not transmit data at the data transmission point in time. Referring to FIG. 7 (c), when the CCA result channel is determined to be idle, the transmitting apparatus may occupy the channel until the next $T_d$ and transmit the data at the next $T_d$. The CCA may be omitted until the next $T_d$ (LBT & shift the DRS till next DRS occasion). In the case of FIG. 7 (c), the base station occupies the channel within only the DMTC window or the number of times by which the base station occupies the channel is limited. Here, the base station may transmit the signal "R" until the next $T_d$. Alternatively, in the case in which the CCA is not terminated at a transmission point in time of the DRS, the base station may omit transmission of the corresponding DRS, and again perform the CCA before a transmission point in time of the next DRS.

Referring to FIG. 7 (d), the base station may also shift the data transmission point in time $T_d$. Here, the data transmission point in time is shifted within only the DMTC window or the number of times by which the data transmission point in time is shifted is limited.

Meanwhile, the DRS may be transmitted in any subframe within the DMTC, where the subframes configured by the DMTC may include including subframe 0 or 5. Hereinafter, methods for generating sequences of PSS, SSS, CRS, CSI-RS, and the like, where those signals are part of DRS, and a method for indicating information on a data bust of an occupied channel will be described in detail. Primary synchronization signal (PSS) required for transmitting data between the base station and the terminal is transmitted in a subframe 0 in the FDD and in subframes 1 and 6 in the TDD, and secondary synchronization signals (SSS) are transmitted in subframes 0 and 5. Cell-specific reference signal (CRS) is transmitted in each downlink subframe, and channel state information reference signal (CSI-RS) is transmitted in a predetermined subframe. However, the PSS, the SSS, the CRS, and the CSI-RS may be transmitted in other subframes due to an operation in an unlicensed band, diversity of channel occupancy depending on the CCA performed to transmit DRS within the DMTC window, or the like.

According to this, 1) a sequence of SSS transmitted in the subframes 0 and 5 may be used or 2) SSS may be newly generated for the purpose of the DRS. Two methods for generating SSS to be described below may be combined with each other. In each method, the SSS is configured by using length-62 sequence.

Method 1 for generating sequence of SSS: This method is a method for generating the sequence of the SSS transmitted in other subframes that are not the subframes 0 and 5 on the basis of Equation 7.

$$d(2n) = \begin{cases} s_0^{(m_0)}(n)c_0(n) & \text{in subframes } 0, 1, 2, 3, 4 \\ s_1^{(m_1)}(n)c_0(n) & \text{in subframes } 5, 6, 7, 8, 9 \end{cases} \quad \text{[Equation 7]}$$

$$d(2n+1) = \begin{cases} s_1^{(m_1)}(n)c_1(n)z_1^{(m_0)}(n) & \text{in subframes } 0, 1, 2, 3, 4 \\ s_0^{(m_0)}(n)c_1(n)z_1^{(m_1)}(n) & \text{in subframes } 5, 6, 7, 8, 9 \end{cases}$$

That is, in the method 1 for generating sequence of SSS, the SSS may be generated by using the sequence generation method defined for subframe 0 and subframe 5, respectively. Therefore, the terminal that receives the SSS may detect the SSS by using the SSS detection method corresponding to the subframe number 0 or 5, and may acquire a cell identification (Cell ID) based on the detection result of the SSS.

Method 2 for generating sequence of SSS: This method is a method for generating a sequence of the SSS transmitted in other subframes that are not the subframes 0 and 5 on the basis of the each subframe number of the other subframes in which the SSS is transmitted.

According to the Method 2 for generating sequence of SSS, DRS or initial signals (for example, signals transmitted by the transmitting apparatus when the transmitting apparatus succeeds in the occupancy of the channel after the CCA and before the transmitting apparatus transmits the data) transmitted in the unlicensed band may be an example of the SSS transmitted in other subframes that are not the subframes 0 and 5.

In the case in which the SSS are transmitted in other subframes that are not the subframes 0 and 5, transmission of the CRS, the CSI-RS, DM-RS, and the like, and transmission of the SSS may be simultaneously generated. That is, the SSS, the PSS, the CRS, the CSI-RS, and the DM-RS may be transmitted in other subframes that are not the subframes 0 and 5. In this case, the CSI-RS may be transmitted when the CSI-RS is configured through a higher layer signaling and DM-RS is included as a part of PDSCH when the PDSCH is transmitted. In other word, DM-RS is not transmitted in the subframe where DRS is only transmitted without PDSCH.

Sequences of the CRS, the CSI-RS, the DM-RS, and the like may be generated depending on one or a combination of two or more of the following methods.

method 1: the sequence of the CRS, the CSI-RS, and the DM-RS is generated based on slot numbers of slots included in the subframe 0 or 5.

method 2: unlike the SSS, the sequence of the CRS, the CSI-RS, and the DM-RS is generated based on slot numbers of slots included in the subframes in which the CRS, the CSI-RS, and the DM-RS are transmitted.

In the method 2, the SSS, the PSS, the CRS, the CSI-RS, and the DM-RS are transmitted in the same subframe (that is, other subframe that is not the subframe 0 and the subframe 5), however the SSS is generated through the equation based on the subframe number of the subframe 0 or the subframe 5, and the CRS, the CSI-RS, and the DM-RS are generated based on the slot numbers of the slot included in the subframe in which the CRS, the CSI-RS, and the DM-RS are transmitted. In this case, the SSS, the CRS, the CSI-RS, and the DM-RS may be transmitted through some OFDM symbols (that is, partial subframe) of a plurality of the OFDM symbols included in one subframe. For example, the DRS may be transmitted through 12 OFDM symbols included in one subframe.

After the DRS is transmitted in at least one other subframe that is not the subframe 0 or 5 in the DRS occasion, data may be transmitted in other subframes that are not the other subframe in which the DRS is transmitted in the DRS occasion. For example, after the base station occupies the channel by performing the CCA in the subframe 1 in the DRS occasion, the base station transmits the DRS in the subframe 2 and transmits data or DRS (re-transmission) in the remaining subframes (subframes 3 and 4) in the DRS occasion.

In the case in which the occupancy of the channel is restrictive depending on a frequency operation regulation, the transmitting apparatus may inform the receiving apparatus of a time length of occupied channel as follows and exchange data with the receiving apparatus or the receiving apparatus may inform the transmitting apparatus of a time length of occupied channel as follows and exchange data with the transmitting apparatus.

First, the receiving apparatus of a sequence may decide a channel occupancy time through a sequence generated on the basis of restrictive channel occupancy. Table 3 represents methods for expressing a channel occupancy time in a slot unit, and Table 4 represents methods for expressing a channel occupancy time in a subframe unit (or a TTI unit).

Referring to Table 3 and Table 4, information on a channel occupancy time may be included in an initial value ($C_{init}$) of a random sequence by a pseudo-random sequence generator generating reference signals (CRS, CSI-RS, DM-RS, or the like). Therefore, the receiving apparatus receiving the reference signals may identify the channel occupancy time through the initial value of the random sequence. Table 5 represents methods for expressing a channel occupancy time in a slot unit in the case in which DRS+PDSCH is transmitted, and Table 6 represents methods for expressing a channel occupancy time in a subframe (or TTI) unit in the case in which DRS+PDSCH is transmitted.

TABLE 3

| | First Slot | Second Slot | Third Slot | Fourth Slot | ... | n-1-th Slot | n-th Slot | Remark |
|---|---|---|---|---|---|---|---|---|
| Method S1 | k | k-1 | k-2 | k-3 | ... | k-(n-2) | k-(n-1) | Current Slot is Number of Slot within COT |
| Method S2 | F(=01) | I(=10) | I(=10) | I(=10( | ... | I(=10) | L(=11) | Determined Depending on Whether Slot is First Slot (F), Intermediate Slot (I), or Last Slot (L) |
| Method S3 | L(=0) | L(=0) | L(=0) | L(=0) | ... | L(=0) | L(=1) | Determined Depending on Whether or not Slot is Last Slot (L) |
| Method S4 | P(=0) | P(=0) | P(=0) | P(=0) | ... | P(=1) | P(=1) | Determined Depending on Whether or not Slot is Partial Slot |

TABLE 4

| | First Subframe | Second Subframe | Third Subframe | Fourth Subframe | ... | n-1-th Subframe | n-th Subframe | Remark |
|---|---|---|---|---|---|---|---|---|
| Method T1 | k | k-1 | k-2 | k-3 | ... | k-(n-2) | k-(n-1) | Current Subframe is Number of Subframe within COT |

TABLE 4-continued

|  | First Subframe | Second Subframe | Third Subframe | Fourth Subframe | ... | n-1-th Subframe | n-th Subframe | Remark |
|---|---|---|---|---|---|---|---|---|
| Method T2 | F(=01) | I(=10) | I(=10) | I(=10) |  | I(=10) | L(=11) | Determined Depending on Whether Subframe is First Subframe (F), Intermediate Subframe (I), or Last Subframe (L) |
| Method T3 | L(=0) | L(=0) | L(=0) | L(=0) |  | L(=0) | L(=1) | Determined Depending on Whether or not Subframe is Last Subframe (L) |
| Method T4 | P(=0) | P(=0) | P(=0) | P(=0) |  | P(=0) | P(=1) | Determined Depending on Whether or not Subframe is Partial Subframe |

TABLE 5

|  | DRS | | | | | | | |
|---|---|---|---|---|---|---|---|---|
|  | First Slot | Second Slot | Third Slot | Fourth Slot | ... | n-1-th Slot | n-th Slot | Remark |
| Method S11 | k | k-1 | k-2 | k-3 | ... | k-(n-2) | k-(n-1) | Current Slot is Number of Slot within COT |
| Method S12 | F(=01) | I(=10) | I(=10) | I(=10) | ... | I(=10) | L(=11) | Determined Depending on Whether Slot is First Slot (F), Intermediate Slot (I), or Last Slot (L) |
| Method S13 | L(=0) | L(=0) | L(=0) | L(=0) | ... | L(=0) | L(=1) | Determined Depending on Whether or not Slot is Last Slot (L) |
| Method S14 | P(=0) | P(=0) | P(=0) | P(=0) | ... | P(=0) | P(=1) | Determined Depending on Whether or not Slot is Partial Slot |

TABLE 6

|  | First Subframe | Second Subframe | Third Subframe (DRS) | Fourth Subframe | ... | n-1-th Subframe | n-th Subframe | Remark |
|---|---|---|---|---|---|---|---|---|
| Method T11 | k | k-1 | k-2 | k-3 | ... | k-(n-2) | k-(n-1) | Current Subframe is Number of Subframe within COT |
| Method T12 | F(=01) | I(=10) | I(=10) | I(=10) | ... | I(=10) | L(=11) | Determined Depending on Whether Subframe is First Subframe (F), Intermediate Subframe (I), or Last Subframe (L) |
| Method T13 | L(=0) | L(=0) | L(=0) | L(=0) | ... | L(=0) | L(=1) | Determined Depending on Whether or not Subframe is Last Subframe (L) |
| Method T14 | P(=0) | P(=0) | P(=0) | P(=0) | ... | P(=0) | P(=1) | Determined Depending on Whether or not Subframe is Partial Subframe |

Referring to Table 3 to Table 6, the receiving apparatus of the reference signals may decide the channel occupancy time on the basis of the current slot or subframe.

in Methods S1, S11, T1, and T11, in the case in which a channel occupancy time after the CCA is n[ms] (n TTIs, n subframes, 2×n slots, or the like), $n_s$ of a first slot may be set to k, $n_s$ of a second slot may be set to k−1, $n_s$ of a third slot may be set to k−2, $n_s$ of a last slot may be set to k−n. Alternatively, $n_s$ may be set to an existing slot number index (or a subframe number index), and one of k−1, k−2, . . . , k−n may correspond to each slot separately from $n_s$, thereby indicating a channel occupancy time of a channel that has been already occupied, a channel occupancy time of a channel that will be occupied in the future, or the like. In this case, the k may be set to maximum occupation time, occupation time n for transmitting the present data, or random number. If the k is equal to n (k=n), an expectation of subframes/slots that will be transmitted after present subframes/slots may be possible.

in Methods S2, S12, T2, and T12, $n_s$ may be replaced by information indicating to which slot or subframe of the occupied channel the current slot or subframe corresponds (that is, information indicating whether or not the current slot or subframe is a first slot or subframe, an intermediate slot or subframe, or a last slot or subframe of the occupied channel) or the above-mentioned information may be included in $C_{init}$ separately from $n_s$.

in Methods S3, S13, T3, and T13, $n_s$ may be replaced by information indicating that the current slot or subframe is the last slot or subframe of the occupied channel or the above-mentioned information may be included in $C_{init}$ separately from $n_s$.

in the case in which the DRS or a signal (for example, the SSS) similar to the DRS is transmitted, Methods 1 and 2 described above may be applied. For example, in the case in which the DRS or the signal similar to the DRS is included, sequences of each slot included in the corresponding subframe may be generated using $n_s$ (=0, 1, or $n_s$=0) of $C_{init}$, and the method for generating sequences described above may be applied to other subframes and slots.

Alternatively, sequences generated on the basis of restrictive channel occupancy or sequences generated on the basis of the same sequence may be mapped to resource elements (REs) through the following Equation 8. According to the following Equation 8, each sequence mapped to the resource elements may be distinguished from each other for each slot and subframe.

$$a_{k,l}^{(p)} = v_{shift,n_s} r_{l,n_s}(m') \quad \text{(Equation 8)}$$

Meanwhile, in an exemplary embodiment, in the case in which the last subframe of the occupied channel is a partial subframe, a communication apparatus may inform an opponent communication apparatus of information on the partial subframe through the following method.

A length of the partial subframe may be set through a radio resource control (RRC) message or be preconfigured between the communication apparatuses. Here, a value indicating the length of the partial subframe may be additionally defined. For example, a subframe represented by P=1 as in Methods S4, S14, T4, and T14 indicates a partial subframe, and the communication apparatus may use the indicated partial subframe. A subframe represented by P=0 may indicate a normal subframe.

In the case in which two or more partial subframes are used, values indicating lengths of the partial subframes may be added. For example, in the case in which four partial subframes are used, 00, 01, 10, 11 may be used as values that may represent lengths of the partial subframes, and a form of "P+length values" may be used. By using the partial subframes, even if the channel becomes available, the expression "P=0" is available for the length of the partial subframe. When "P=0", the length of the partial subframes may be ignored.

Information on whether or not the partial subframes are used and the length values of the partial subframes may be included in the sequences described above or be included in a channel (for example, a PCFICH, a DCI (within the PDCCH, a PHICH, or the like) defined in advance). In the case in which the information on whether or not the partial subframes are used and the length values of the partial subframes are included in the physical hybrid ARQ indicator channel (PHICH), they may be included instead of the HARQ ACKs/NACKs.

In the case in which the information on whether or not the partial subframes are used and the length values of the partial subframes are included in the physical control format indicator channel (PCFICH), a portion of the PDCCH representing an OFDM symbol length may be replaced by RRC signaling or be represented immediately before a portion indicating a starting position of the PDSCH and the EPDCCH. In addition, only in the case in which application is made to all subframes or the partial subframes are included, the information on whether or not the partial subframes are used and the length values of the partial subframes are included in the PCFICH. In addition, a portion of the PCFICH about the PDCCH may be limited to one OFDM symbol or two OFDM symbols. In a case in which a portion of the PDCCH is limited to one OFDM symbol or two OFDM symbols, a PHICH duration of the extended PHICH duration may be set to 1 or 2, or 3. When the PHICH duration is 3, the PHICH duration may be indicated to the terminal, so that the terminal recognizes 2. This configuration is similar to that of the DwPTS.

In the case in which the information on whether or not the partial subframes are used and the length values of the partial subframes are included in the PDCCH, the information on whether or not the partial subframes are used and the length values of the partial subframes may be included as common downlink control information (DCI) in a common search space received in common by all terminals.

Meanwhile, in the partial subframes, the DRS may be transmitted only in the case in which it is longer than a predetermined length of partial subframe or may not be transmitted in any partial subframe.

Figure 8:
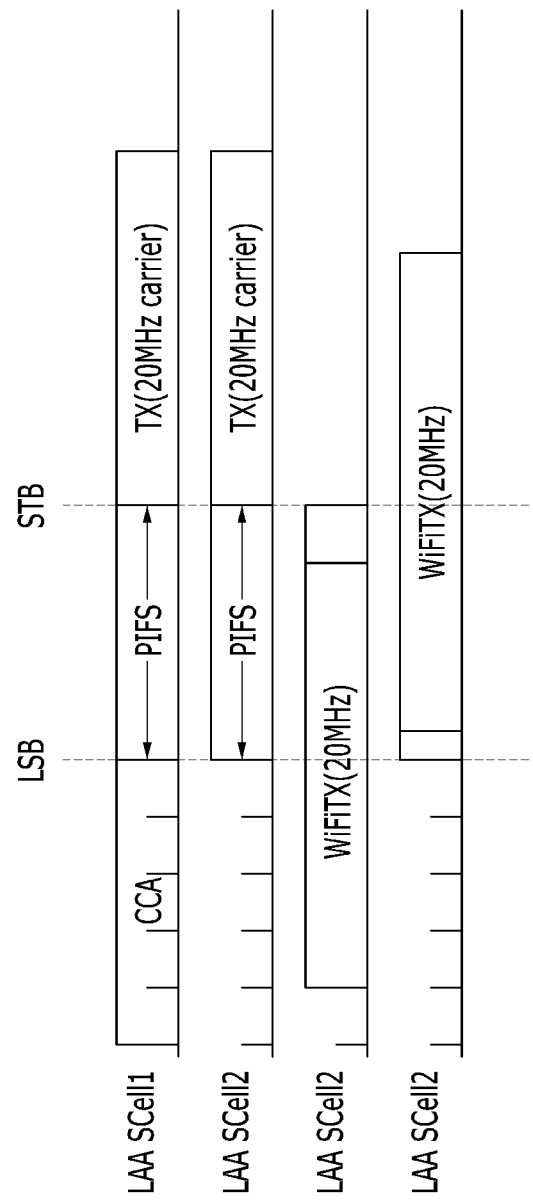
FIG. 8 is a schematic view showing a channel access method of a multi-carrier network according to an exemplary embodiment.

FIG. 8 is a schematic view showing a channel access method of a multi-carrier network according to an exemplary embodiment.

In FIG. 8, the transmitting apparatus accesses a channel operated by a multi-carrier in order to transmit data. Referring to FIG. 8, the transmitting apparatus performs the CCA through a first SCell. In addition, the transmitting apparatus may additionally sense channels for a predetermined time (for example, a time from a point coordination function inter-frame space (PIFS) or an LBT synchronization boundary (LSB) to a synchronous transmission boundary (STB)) after performing the CCA, and transmit data in the first SCell and a second SCell. Referring to FIG. 8, channels of a third SCell and a fourth SCell are occupied by another apparatus (for example, a WiFi band apparatus, or the like) operated in an unlicensed band, such that they are not used for data transmission of mobile communication. In this case, the transmitting apparatus may perform the CCA in only one channel, and simultaneously use another channel such as a channel of the second SCell through additional sensing. Since the transmitting apparatus does not perform the CCA on other channels such as channels of the third SCell and the fourth SCell, other apparatuses may use the channels of the third SCell and the fourth SCell. That is, the transmitting apparatus may perform the CCA on only one channel, and may recognize whether or not other channels are occupied through additional sensing after the CCA. In the following, the transmitting apparatus accesses/occupies the channels in order to transmit data, and the receiving apparatus accesses/occupies the channels in order to receive the data. In the following, a case in which the transmitting apparatus performs the CCA will be described, and this description may be applied to a case in which the receiving apparatus performs the CCA. However, the present description is not limited thereto.

FIGS. 9A and 9B are schematic views showing a channel access method of a multi-carrier network according to another exemplary embodiment.

Referring to FIGS. 9A and 9B, the communication apparatus may perform the CCA for each carrier individually at the same time, and exchange (transmit and receive) data through a multi-channel depending on a CCA result. In this case, the communication apparatus may perform channel sensing for a predetermined time (for example, a time corresponding to 'Self-deferral of FIGS. 9A and B+1 CCA slot') in an idle channel as the CCA result, and wait for termination of the CCAs of other carriers.

Figure 9:
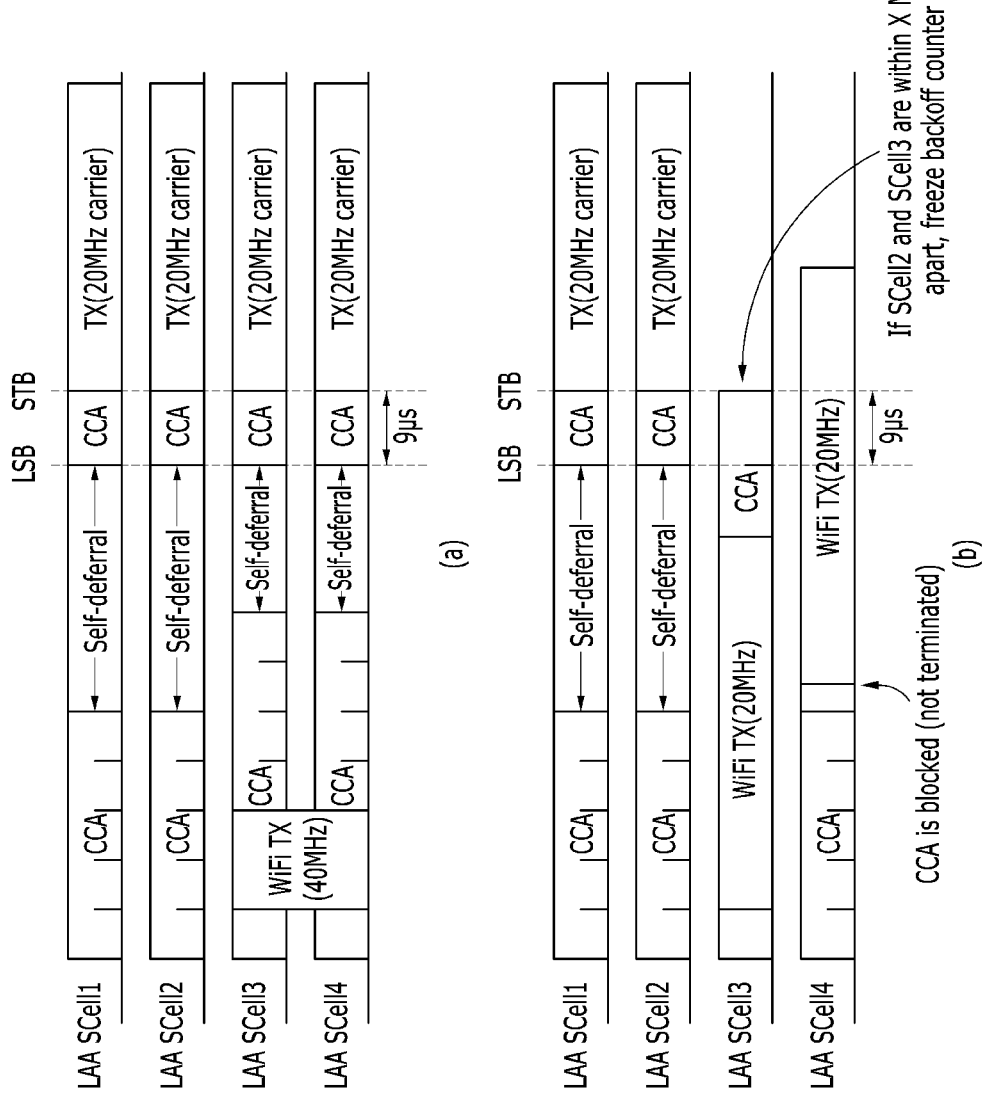
FIG. 9 is a schematic view showing a channel access method of a multi-carrier network according to another exemplary embodiment.

Referring to FIG. 9 (a), CCAs of the first SCell and the second SCell are terminated before CCAs of the third SCell and the fourth SCell. Therefore, the communication apparatus performs channel sensing after the CCAs are terminated until before data transmission point in times so that all of the data transmission points in time may coincide with each other in the first to fourth SCells.

Referring to FIG. 9 (b), in a process in which the communication apparatus performs the channel sensing until before the data transmission points in time after the CCAs of the first SCell and the second SCell are terminated, a carrier (the third SCell) of which the CCA is not terminated before the LSB or a carrier (the fourth SCell) decided that occupancy of the channel is impossible in a state in which the CCA is not terminated may be generated. In this case, the communication apparatus may also not use the first SCell and the second SCell to transmit the data. Here, when a channel interval between the second SCell and the third SCell is smaller than a predetermined interval (for example, MHz unit), the communication apparatus may terminate the CCA of the third SCell, and may again perform the CCA in the case in which channel occupancy for the second SCell is terminated or released. However, in the case in which a time from a CCA termination point in time for the first SCell and the second SCell to the LSB (or the STB) is relatively long, another unlicensed band apparatus may use the carriers of the first SCell and the second SCell.

When another unlicensed band apparatus occupies the channel during the CCA and the CCA is not terminated before an STB point in time after another unlicensed band apparatus occupies the channel as in the third SCell of FIG. 9 (b) (that is, when the CCA is not terminated during a PIFS section (for example, self-deferral+1 CCA slot (20 us)) after occupancy of the channel of another unlicensed band apparatus is terminated), the communication apparatus may operate only the first SCell and the second SCell as a multi-carrier. That is, the communication apparatus may not use the third SCell as a data transmission carrier.

Meanwhile, in the case in which CCA termination points in time of the first SCell and the second SCell are earlier than those of the third SCell and the fourth SCell, an addition channel sensing period of the communication apparatus is longer than a predetermined time, such that the communication apparatus may not occupy the channel. Here, the predetermined time may be a defer period (DP), which may be defer duration (DD)+1 CCA slot or PIFS. In this case, DP≥PIFS≥0 or PIFS≥DP≥0.

Figure 10:
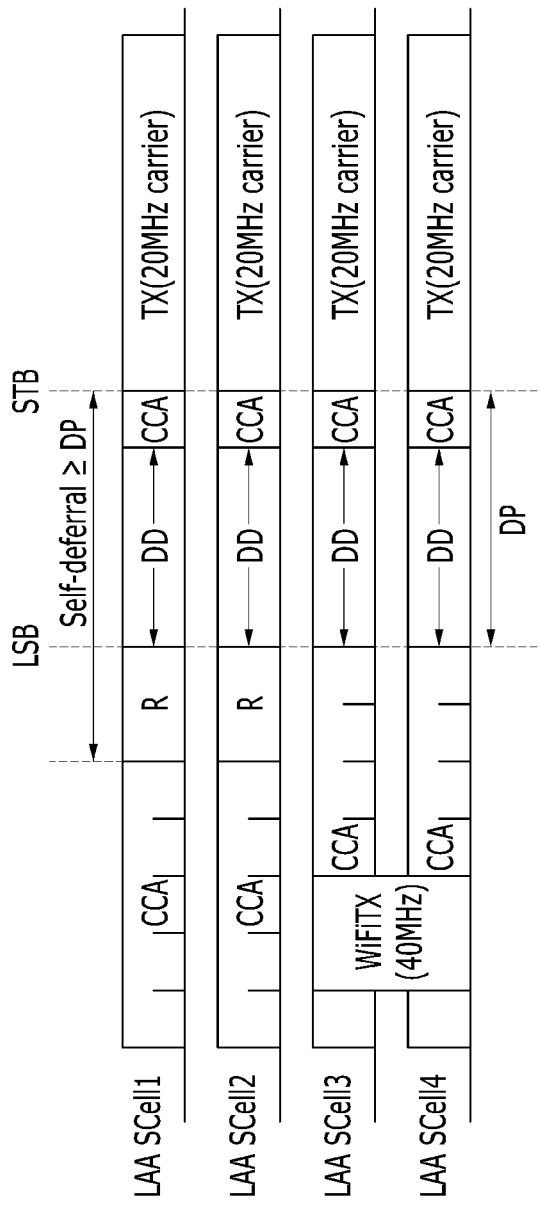
FIGS. 10 to 12 are schematic views showing a channel access method of a multi-carrier network according to yet another exemplary embodiment.
Figure 11:
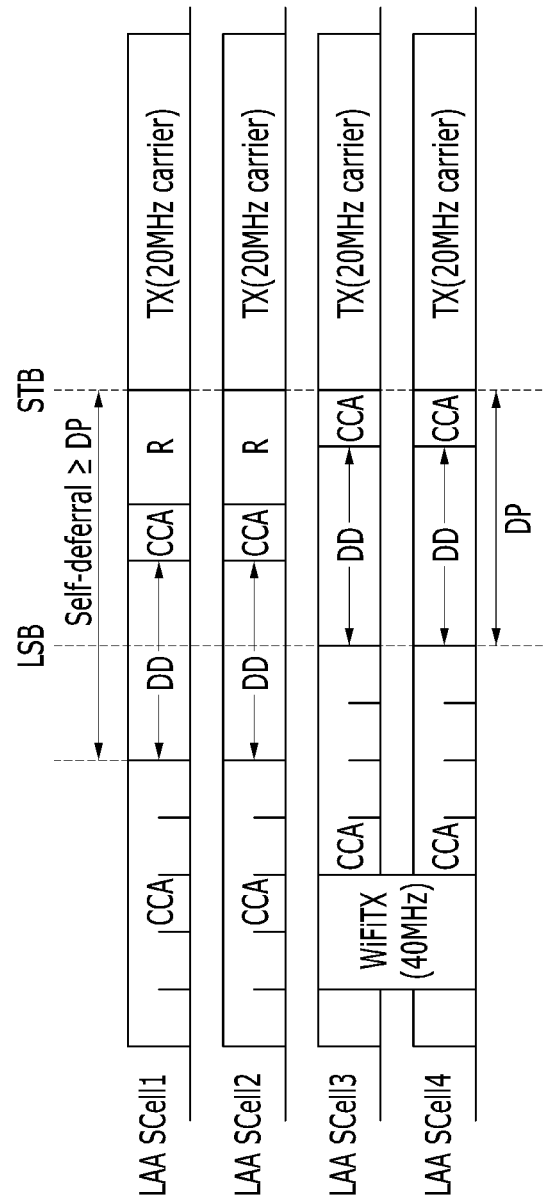
Figure 12:
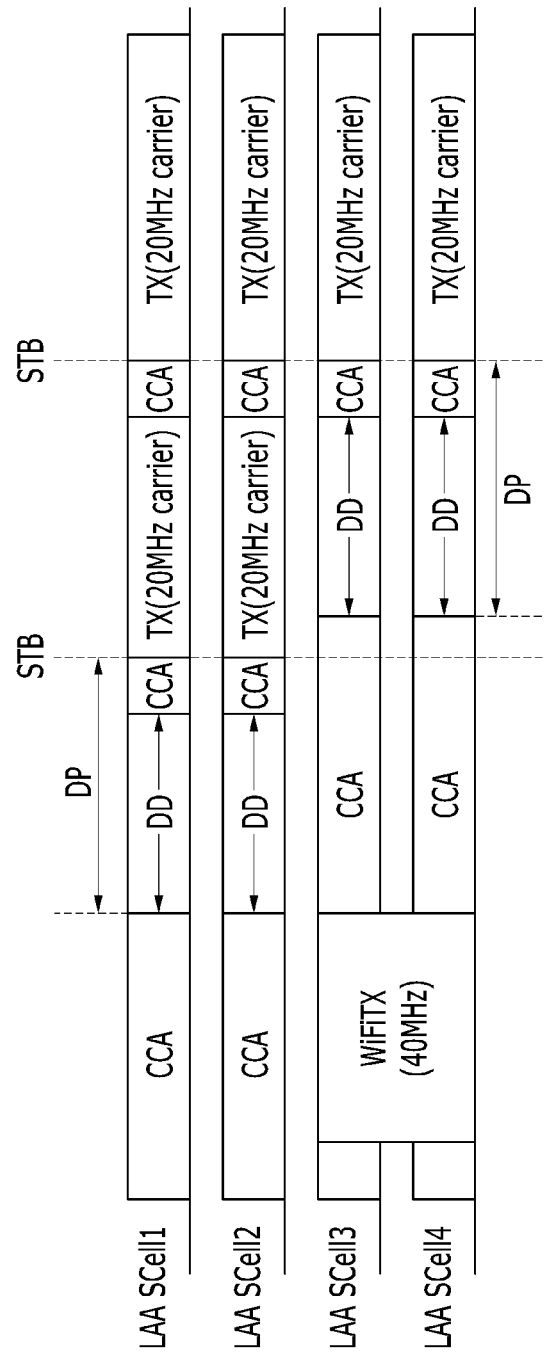

FIGS. 10 to 12 are schematic views showing a channel access method of a multi-carrier network according to yet another exemplary embodiment.

Referring to FIG. 10, the communication apparatus does not sense the channels for a time from after the CCAs are terminated for the first SCell and the second SCell until the CCAs are terminated for the third SCell and the fourth SCell, and transmits a special signal R (R≥0) in the first SCell and the second SCell in order to prevent the first SCell and the second SCell from be occupied by another unlicensed band apparatus. Then, the communication apparatus may sense the channels during the DP in the first to fourth SCells, and then start data transmission at the STB point in time.

Referring to FIG. 11, the communication apparatus senses the channels during the DP after terminating the CCAs for the first to fourth SCells, and transmits the special signal R in the first SCell and the second SCell for which the CCAs are first terminated. That is, in FIGS. 10 and 11, the communication apparatus may allow data transmission points in time of each carrier to coincide with each other by transmitting the special signal R.

Referring to FIG. 12, the CCAs for the third SCell and the fourth SCell are not terminated during the DP for the first SCell and the second SCell. In this case, the communication apparatus transmits data using the carriers of the first SCell and the second SCell when additional channel sensing of the first SCell and the second SCell is terminated. Then, in the case in which channel occupancy times for the first SCell and the second SCell do not expire, the communication apparatus may transmit data using the carriers of first to fourth SCells at a point in time in which the DPs for the third SCell and the fourth SCell are terminated.

Hereinafter, an unlicensed band channel access method for operating a multi-cell will be described with reference to FIGS. 13 to 16.

Figure 13:
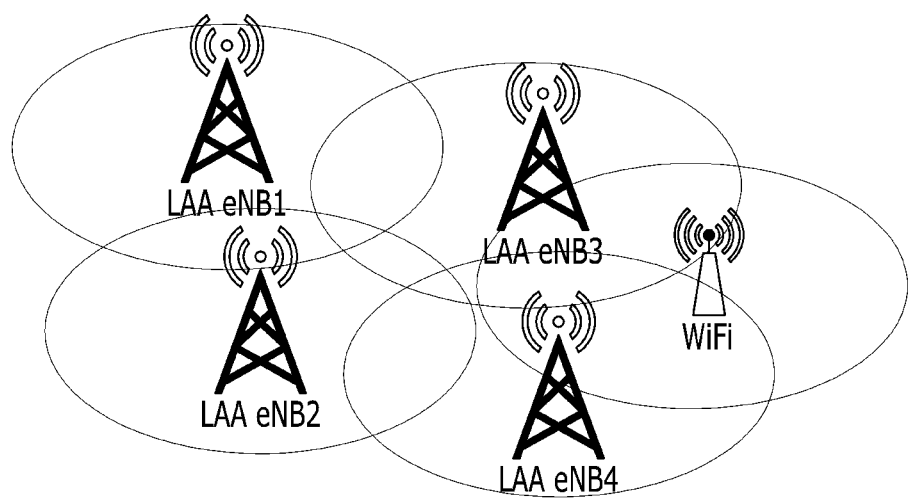
FIG. 13 is a schematic view showing a multi-cell network according to an exemplary embodiment.

FIG. 13 is a schematic view showing a multi-cell network according to an exemplary embodiment.

Referring to FIG. 13, in the case in which a plurality of base stations or access points (APs) included in the multi-cell network access channels of an unlicensed band and occupy the channels to transmit data, CCA parameters (for example, CCA slots, energy detection levels, DPs, or the like) used in the case in which the respective communication apparatuses perform a CCA may be the same as each other. However, energies of the channels may be differently measured due to a spatial difference between sensing regions in which the respective communication apparatuses perform the CCA. In this case, only some of the communication apparatuses access the channels to occupy the channels, the other communication apparatuses may decide that the channels are being used, and a count-down of CCA slots may be deferred (the CCA slots may be frozen). In this case, the other communication apparatuses failing in accessing the channels again measure energies of the channels and confirm whether or not the channels are occupied. That is, although a plurality of communication apparatuses perform the CCA using the same parameters, they may not perform a channel access simultaneously with other unlicensed band apparatus due to performing of the CCA. The plurality of communication apparatuses may simultaneously perform the channel access by the following method. In the following, a method that the plurality of the communication apparatuses that perform the CCA by using the same CCA parameters simultaneously perform the channel access is described.

FIGS. 14A to 16 are schematic views showing a channel access method of a multi-cell network according to an exemplary embodiment.

Figure 14:
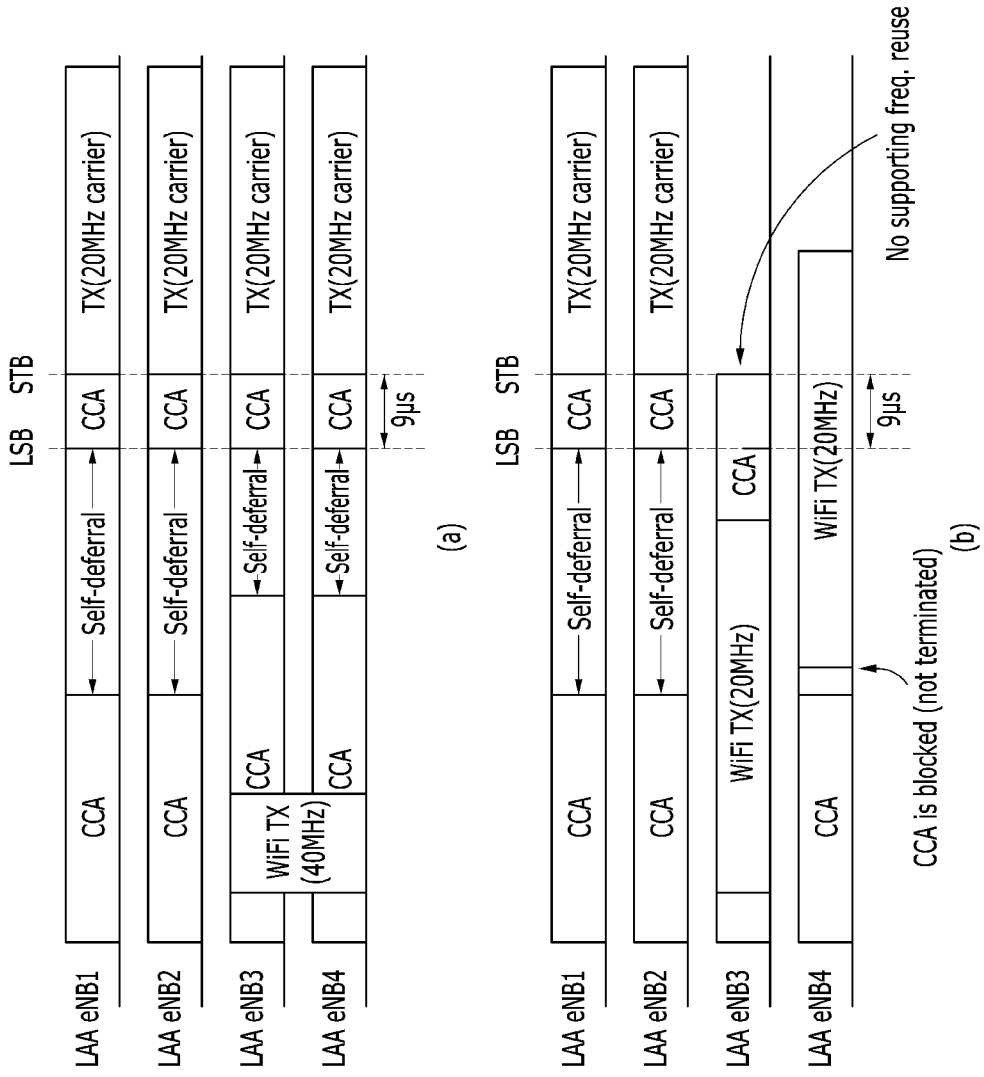
FIGS. 14 to 16 are schematic views showing a channel access method of a multi-cell network according to an exemplary embodiment.
Figure 15:
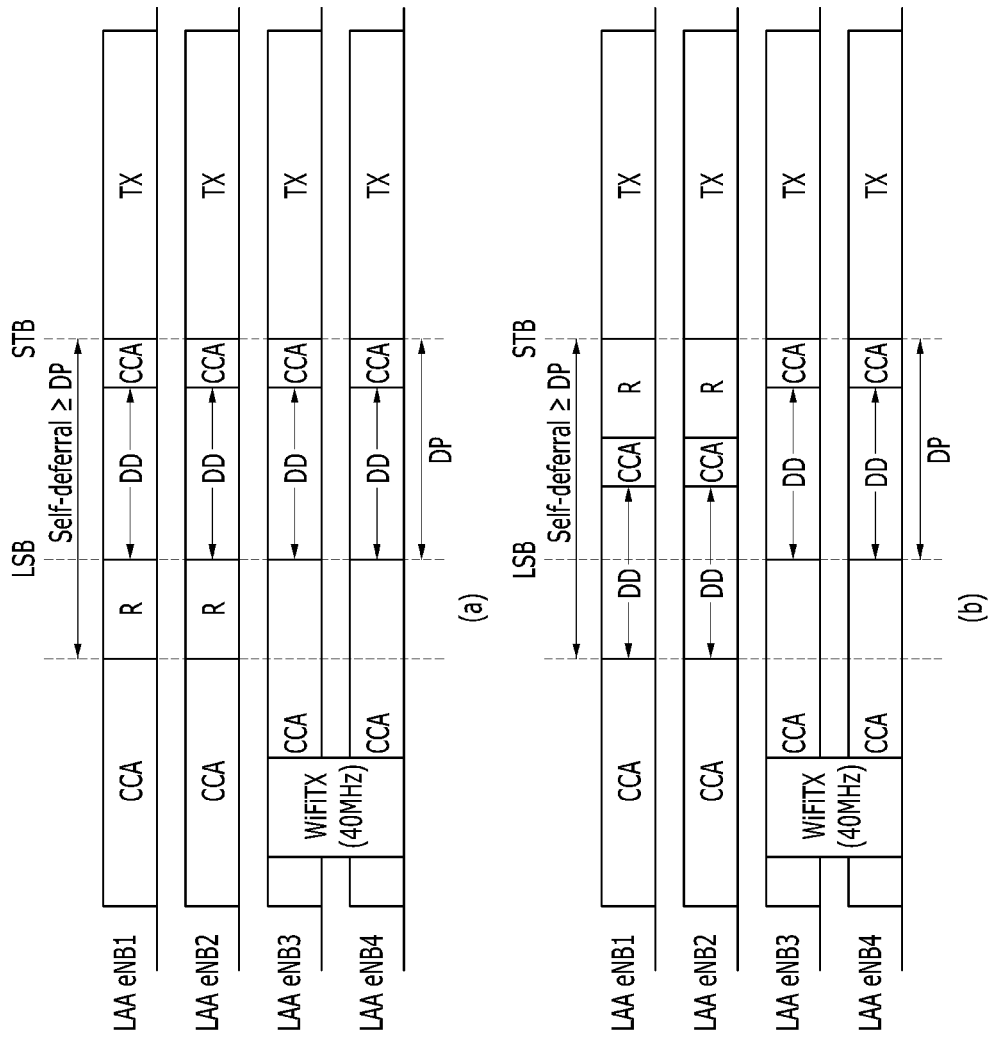

Referring to FIG. 14 (a), a first base station (LAA eNB 1) and a second base station (LAA eNB 2) transmit information on termination of CCAs, such as a CCA termination fact, a CCA termination point in time, or the like, to other base stations (a third base station (LAA eNB 3) and a fourth base station (LAA eNB 4)) after they terminate the CCAs. Then, the base stations (the first and second base stations) terminating the CCAs perform additional sensing for a predetermined self-deferral section. In addition, the base stations (the third and fourth base stations) receiving the information on the termination of the CCAs terminate CCAs in a self-deferral section and then perform additional sensing. At the same time, in the case in which information on a point in time (STB) for starting a service is preconfigured and shared between the respective base stations, the respective base stations may perform self-deferral until the STB. Here, at least one CCA slot may be included after the self-deferral or be included in the self-deferral. In the case of the first and second base stations, the self-deferral section may be formed to be longer than the DP. Therefore, as shown in FIGS. 15A and 15B, the first and second base stations may transmit a special signal R to perform a channel access simultaneously with the third and fourth base stations. The first and second base stations transmit the special signal R before DD in FIG. 15 (a), and transmit the special signal R after DD in FIG. 15(b).

Referring to FIG. 14 (b), the third and fourth base stations have not terminated the CCAs due to other unlicensed band apparatus. Other unlicensed band apparatuses have used the channel during a period in which the third base station performs the CCA, and other unlicensed band apparatuses have used the channel in a state in which the CCA of the fourth base station is not terminated. Here, the base stations (the third and fourth base stations) that do not terminate the CCAs may transmit information on CCA slots frozen during a period in which they perform the CCAs to other base stations (the first and second base stations). Here, the information on the frozen CCA slots may be transmitted to other base stations at a point in time in which the CCA slots are frozen or a point in time in which a count-down is resumed. The third and fourth base stations may perform the CCAs separately from the first and second base stations and occupy the channels in the case in which a time length of the remaining CCA slots is longer than the self-deferral section. That is, in this case, a simultaneous channel access is performed on only the first and second base stations.

Figure 16:
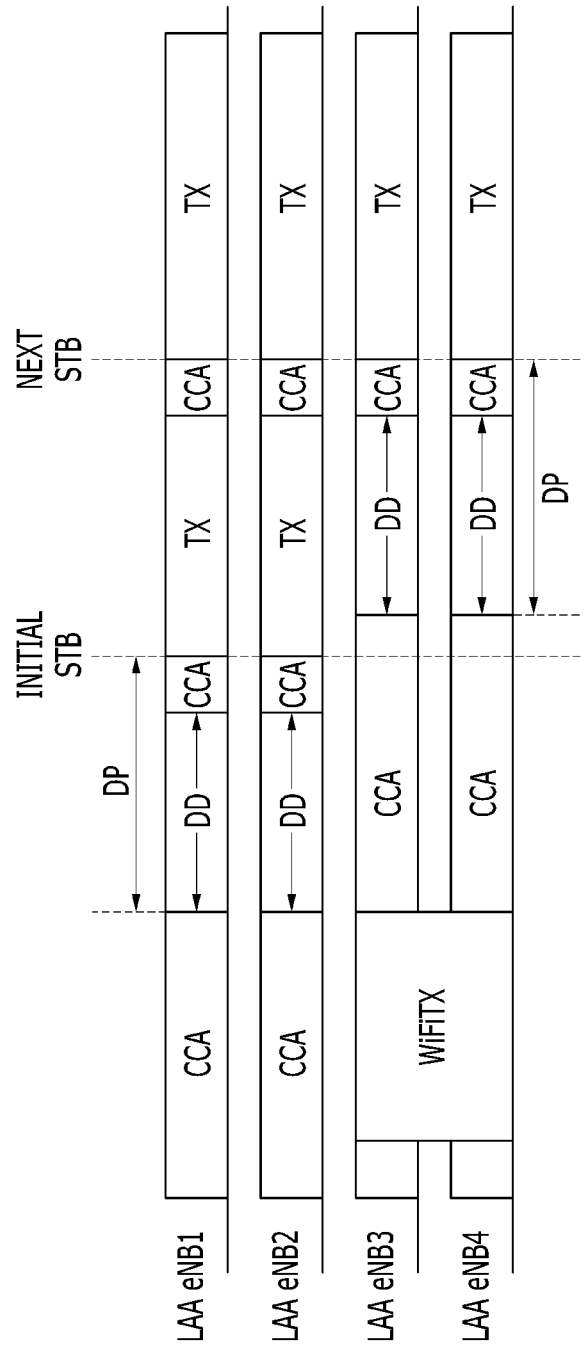

Referring to FIG. 16, a plurality of STBs may be set. In the case in which CCAs of some base stations (the third and fourth base stations) are terminated after an initial STB, all the base stations (the first to fourth base stations) may simultaneously transmit data after some base stations terminate the CCAs and occupy channels. That is, the data may be simultaneously transmitted at the next STB. Here, the next STB may be positioned after additional sensing sections of the third and fourth base stations, and sections (for example, CCA slots, or the like) for synchronization of data transmission may be included in DPs positioned after the CCAs of the third and fourth base stations.

Figure 17:
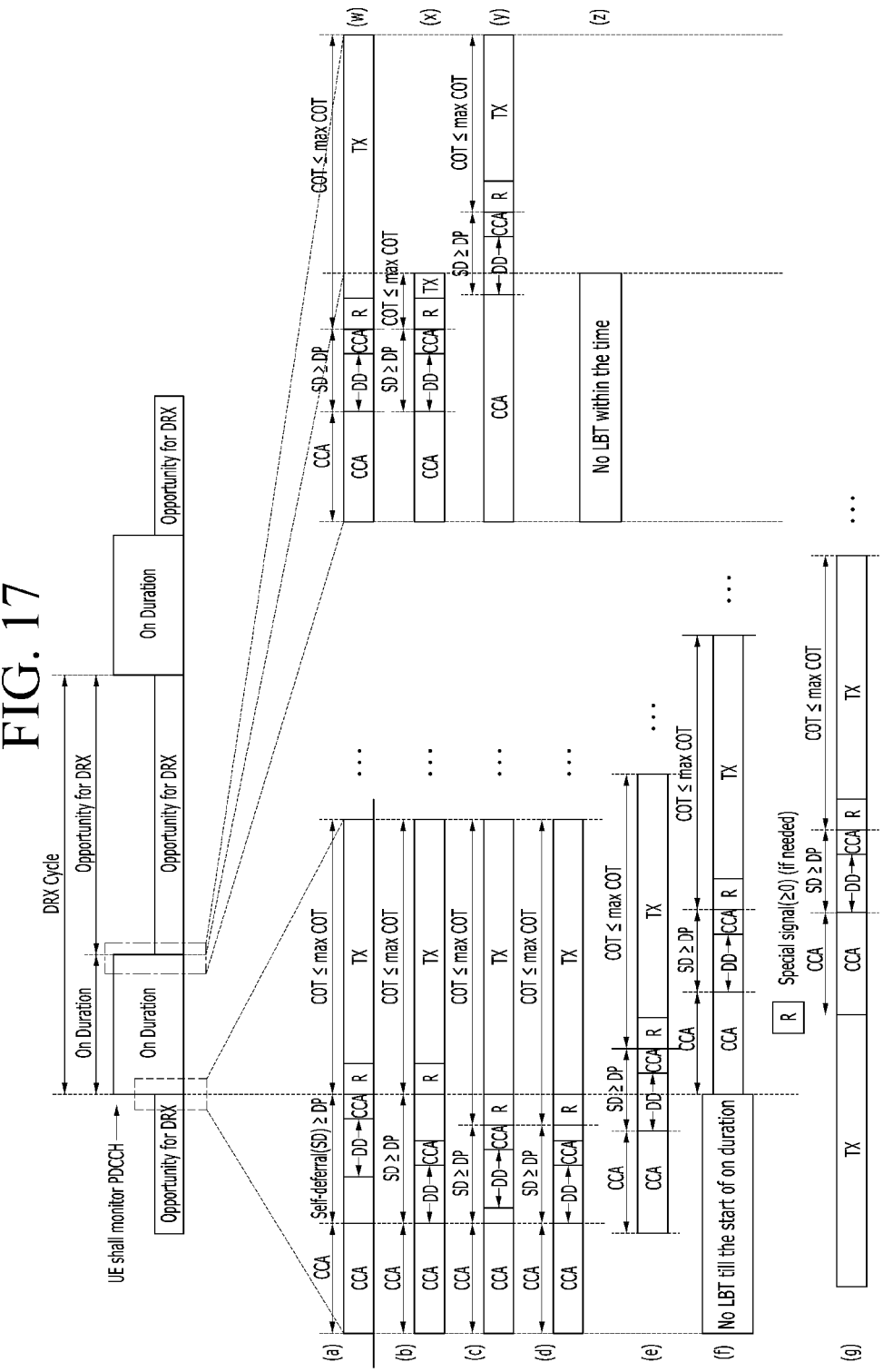
FIG. 17 is a schematic view showing a channel access method in the case in which discontinuous reception (DRX) is performed according to an exemplary embodiment.

Meanwhile, the communication apparatus may access a channel by a plurality of different methods in the case of discontinuous reception (DRX). FIG. 17 is a schematic view showing a channel access method in the case in which DRX is performed according to an exemplary embodiment.

Referring to FIG. 17, the DRX performed by the communication apparatus includes an on-duration and an off-duration (for example, an opportunity for the DRX). In the off-duration, the terminal monitors the (E)PDCCH. In addition, in the on-duration, the base station and the terminal perform procedures for transmitting/receiving data. For example, the terminal may receive the (E)PDCCH for transmitting/receiving the data in the on-duration. The base station needs to perform the CCA in order to transmit the (E)PDCCH through the unlicensed band, and the terminal also needs to perform the CCA in order to transmit/receive the data depending on a reception result of the (E)PDCCH. That is, a channel access method depending on the DRX to be described below may be applied to a transmitting apparatus (for example, a base station of a downlink, a terminal of an uplink, or a transmitting side in the case of data exchange between apparatuses) that is to transmit data to a receiving apparatus (for example, a terminal of a downlink, a base station of an uplink, or a receiving side in the case of data exchange between apparatuses), and may also be applied to the receiving apparatus receiving data from the transmitting apparatus.

FIGS. 17 (a) to (g) show a channel access method in the vicinity of an on-duration start point in time, and FIGS. 17 (w) to (z) show a channel access method in the vicinity of an on-duration termination point in time. At the on-duration start point in time, the base station may transmit and receive data to and from a terminal corresponding to an on-duration in the case in which a channel is occupied, and performs the CCA for occupying the channel in the case in which the channel is not occupied. The communication apparatus may perform the CCA at a point in time ahead of the on-duration start point in time by a predetermined time (one OFDM symbol or two OFDM symbols, one slot, one subframe, or the like), and perform additional sensing or transmit a special signal R from after the CCA is terminated until the on-duration start point in time (FIGS. 17 (a) to (e)).

Here, the special signal R may be transmitted within an on-duration and be used for synchronization for data exchange and prevention of an access of other unlicensed band apparatuses (FIGS. 17 (a) and (b)). Alternatively, the special signal R may be transmitted before the on-duration and be used for time synchronization up to the on-duration (FIGS. 17 (c) and (d)).

Referring to FIG. 17 (f), in the case in which the communication apparatus does not perform the LBT before the on-duration, the CCA is performed after the on-duration, and the special signal S informs the receiving apparatus of a predetermined method, thereby making it possible to assist in receiving data.

Referring to FIG. 17 (g), in the case in which the unlicensed band is occupied and used by other unlicensed band apparatuses (a serving base station, a WiFi apparatus, and the like) at the time of shifting from the on-duration to the off-duration, the base station 1) may assume that it is difficult to exchange data until a usable point in time of the unlicensed band and may not expect that data will be exchanged at a shift point in time from the off-duration to the on-duration, or 2) may add the special signal R to each subframe (or each TTI) in order to exchange data at a shift point in time from the on-duration to the off-duration.

Meanwhile, in the case in which a time from after the CCA until data exchange is included in the off-duration, the base station 1) may perform additional sensing (DP), 2) transmit the special signal R, or 3) exchange data with other terminals corresponding to the on-duration. In the case in which the base station exchanges the data with other terminals corresponding to the on-duration, the base station may transmit the (E)PDCCH for exchanging the data and exchange the data in only an on-duration of a specific terminal depending on a DRX cycle set for each terminal.

In the case in which a maximum channel occupancy time depending on an unlicensed band frequency operation regulation expires in the on-duration, the CCA for accessing the channel may be additionally performed. At a point in time in which the on-duration is terminated and the off-duration (the opportunity for the DRX) starts (a shift point in time from the on-duration to the off-duration may be preconfigured in the terminal) as shown in FIGS. 17 (w) to (z), one or a combination of two or more of the following methods may be instructed to the receiving terminal.

- at the shift point in time from the on-duration to the off-duration, a limitation may be made so that the CCA for accessing the channel is not performed (FIG. 17(z)).
- when the CCA for accessing the channel is terminated within a predetermined time before the shift point in time, channel occupancy may be extended to the off-duration by a channel occupancy time determined through the CCA (FIG. 17 (y)).
- when the channel is occupied through the CCA in the on-duration and a start time of the off-duration comes prior to arriving at the maximum channel occupancy time, 1) data transmission may be stopped depending on termination of the on-duration (FIG. 17(x)) or 2) the on-duration may be extended by a time extended for the purpose of the maximum channel occupancy time and a shift point in time to the off-duration may be deferred (FIG. 17 (w)). In the case in which the shift point in time to the off-duration is deferred, a DRX cycle may be re-adjusted so that the next on-duration is deferred by a time by which a start point in time of the off-duration is deferred. Alternatively, the DRX cycle may be maintained in an originally set state regardless of the deferral of the shift point in time to the off-duration.

Figure 18:
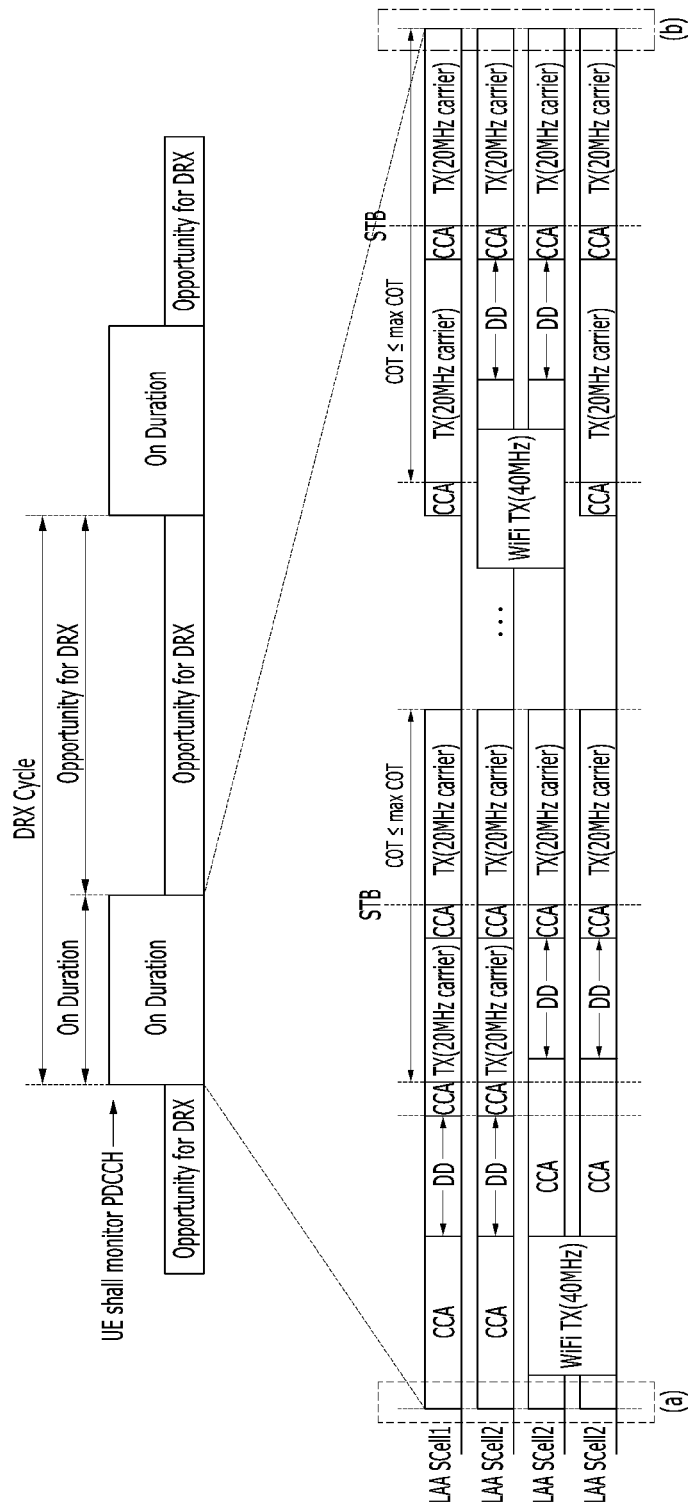
FIG. 18 is a schematic view showing a channel access method in the case in which DRX is performed according to another exemplary embodiment.

FIG. 18 is a schematic view showing a channel access method in the case in which DRX is performed according to another exemplary embodiment.

In FIG. 18, a method for operating an unlicensed multi-carrier in an on-duration is shown. Referring to FIG. 18, the DRX performed by the communication apparatus includes an on-duration and an off-duration (for example, an opportunity for the DRX). In the on-duration, the base station and the terminal perform procedures for transmitting/receiving data. For example, the terminal may receive the (E)PDCCH for transmitting/receiving the data in the on-duration. The base station needs to perform the CCA in order to transmit the (E)PDCCH through the unlicensed band, and the terminal also needs to perform the CCA in order to transmit/receive the data depending on a reception result of the (E)PDCCH. Additionally, in order for a multi-carrier to be operated for a DRX cycle, one or a combination of two or more of the methods for operating a multi-carrier in an unlicensed band described with reference to FIG. 17 may be applied to each carrier. Here, the DRX cycle may be independently operated for each carrier or be operated in common for the multi-carrier.

In the case in which the DRX cycle is operated in common, the CCA is performed within the on-duration or immediately before the on-duration at the time of shifting from the off-duration to the on-duration as shown in FIG. 18A, such that power of the terminal may be saved. In the case in which the on-duration after the CCA corresponds to an off-duration of the terminal, the base station may perform additional sensing until an on-duration of the terminal, such as DP (or self-deferral, a PIFS, or the like) or transmit a special signal R. Here, after the CCA, data exchange may be performed in the on-duration.

Figure 19:
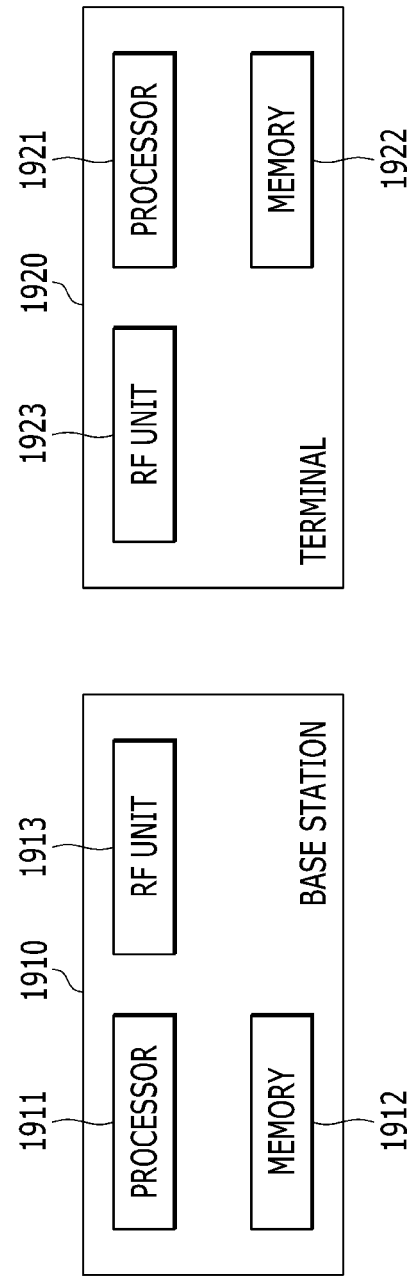
FIG. 19 is a block diagram illustrating a wireless communication system according to an exemplary embodiment.

FIG. 19 is a block diagram showing a wireless communication system according to an exemplary embodiment.

Referring to FIG. 19, the radio frequency system according to an exemplary embodiment includes a base station 1910 and a terminal 1920.

The base station 1910 includes a processor 1911, a memory 1912, and a radio frequency unit (RF unit) 1913. The memory 1912 may be connected to the processor 1911 to store various kinds of information for driving the processor 1911 or at least one program executed by the processor 1911 therein. The radio frequency unit 1913 may be connected to the processor 1911 to transmit/receive radio frequency signals to/from the processor 1911. The processor 1911 may implement functions, processes, or methods suggested in an exemplary embodiment. Here, in the radio frequency system according to an exemplary embodiment, a radio interface protocol layer may be implemented by the processor 1911. An operation of the base station 1910 according to an exemplary embodiment may be implemented by the processor 1911.

The terminal 1920 includes a processor 1921, a memory 1922, and a radio frequency unit 1923. The memory 1922 may be connected to the processor 1921 to store various kinds of information for driving the processor 1921 or at least one program executed by the processor 1921 therein. The radio frequency unit 1923 may be connected to the processor 1921 to transmit/receive radio frequency signals to/from the processor 1921. The processor 1921 may implement functions, steps, or methods suggested in an exemplary embodiment. Here, in the radio frequency system according to an exemplary embodiment, a radio interface protocol layer may be implemented by the processor 1921. An operation of the terminal 1920 according to an exemplary embodiment may be implemented by the processor 1921.

In an exemplary embodiment, the memory may be positioned inside or outside the processor, and may be connected to the processor through various means that are well-known. The memory may be various types of volatile or non-volatile storage medium, and may include, for example, a read-only memory (ROM) or a random access memory (RAM).

Although the exemplary embodiment has been described in detail hereinabove, the scope of the present invention is not limited thereto. That is, several modifications and alterations made by those skilled in the art using a basic concept of the present invention as defined in the claims fall within the scope of the present invention.

What is claimed is:

1. An apparatus for receiving a signal through an unlicensed band, comprising:
   a processor, a memory, and a radio frequency (RF) unit, wherein the processor executes a program stored in the memory to perform:
   receiving, by using the RF unit, a secondary synchronization signal (SSS), a primary synchronization signal (PSS), and a cell-specific reference signal (CRS) through any one subframe of a subframe 1, a subframe 2, a subframe 3, a subframe 4, a subframe 6, a subframe 7, a subframe 8, or a subframe 9 included in a discovery signal measurement timing configuration (DMTC) window, the any one subframe being other than a subframe 0 and a subframe 5;

detecting, by using a subframe number of the subframe 0, the SSS when the SSS is received by the RF unit in the subframe 1, the subframe 2, the subframe 3, or the subframe 4; and detecting, by using a subframe number of the subframe 5, the SSS when the SSS is received by the RF unit in the subframe 6, the subframe 7, the subframe 8, or the subframe 9.

2. The apparatus of claim 1, wherein:

the SSS is configured by using length-62 sequence generated by the following equation, $$d(2n) = \begin{cases} s_0^{(m_0)}(n)c_0(n) & \text{in subframes } 0,1,2,3,4 \\ s_1^{(m_1)}(n)c_0(n) & \text{in subframes } 5,6,7,8,9 \end{cases}$$ [Equation]

$$d(2n+1) = \begin{cases} s_1^{(m_1)}(n)c_1(n)z_1^{(m_0)}(n) & \text{in subframes } 0,1,2,3,4 \\ s_0^{(m_0)}(n)c_1(n)z_1^{(m_1)}(n) & \text{in subframes } 5,6,7,8,9 \end{cases}$$

and the DMTC window comprises the subframes 0, 1, 2, 3, 4, or the subframes 5, 6, 7, 8, 9.

3. The apparatus of claim 1, wherein the processor executes the program to further perform:

acquiring a cell identification (Cell ID) based on a detection result of the SSS.

4. The apparatus of claim 1, wherein when the processor performs receiving the SSS, the PSS, and the CRS, the processor performs receiving a channel state information-reference signal (CSI-RS) in the any one subframe.

5. The apparatus of claim 1, wherein when the processor performs receiving the SSS, the PSS, and the CRS, the processor performs receiving the SSS, the PSS, and the CRS in 12 orthogonal frequency division multiplexing (OFDM) symbols included in the any one subframe.

6. The apparatus of claim 1, wherein the processor executes the program to further perform:

detecting the CRS by using a slot number of a slot included in the any one subframe.

* * * * *